(12) United States Patent
Kim

(10) Patent No.: US 8,797,317 B2
(45) Date of Patent: Aug. 5, 2014

(54) MOBILE TERMINAL AND CONTROL METHOD THEREOF

(75) Inventor: Jonghwan Kim, Incheon (KR)

(73) Assignee: LG Electronics Inc., Seoul (KR)

(*) Notice: Subject to any disclaimer, the term of this patent is extended or adjusted under 35 U.S.C. 154(b) by 376 days.

(21) Appl. No.: 13/178,780

(22) Filed: Jul. 8, 2011

(65) Prior Publication Data

US 2012/0242652 A1 Sep. 27, 2012

(30) Foreign Application Priority Data

Mar. 24, 2011 (KR) .................. 10-2011-0026589

(51) Int. Cl.
*G06T 15/00* (2011.01)

(52) U.S. Cl.
USPC .......................................... 345/419; 715/852

(58) Field of Classification Search
USPC ............. 345/156, 158, 419; 715/836, 848–52
See application file for complete search history.

(56) References Cited

U.S. PATENT DOCUMENTS

| | | | | |
|---|---|---|---|---|
| 6,727,924 | B1* | 4/2004 | Anderson | 715/851 |
| 7,043,701 | B2* | 5/2006 | Gordon | 715/848 |
| 7,698,658 | B2* | 4/2010 | Ohwa et al. | 715/835 |
| 7,880,726 | B2* | 2/2011 | Nakadaira et al. | 345/173 |
| 8,334,841 | B2* | 12/2012 | Boillot et al. | 345/158 |
| 2005/0210410 | A1 | 9/2005 | Ohwa et al. | |
| 2007/0220437 | A1* | 9/2007 | Boillot | 715/762 |
| 2008/0122798 | A1* | 5/2008 | Koshiyama et al. | 345/173 |
| 2009/0027337 | A1* | 1/2009 | Hildreth | 345/158 |
| 2009/0289914 | A1* | 11/2009 | Cho | 345/173 |
| 2010/0328438 | A1* | 12/2010 | Ohyama et al. | 348/51 |
| 2012/0005624 | A1* | 1/2012 | Vesely | 715/808 |

FOREIGN PATENT DOCUMENTS

| | | |
|---|---|---|
| CN | 1670679 A | 9/2005 |
| CN | 1694056 A | 11/2005 |
| CN | 101810003 A | 8/2010 |
| CN | 101938666 A | 1/2011 |
| CN | 101989179 A | 3/2011 |

* cited by examiner

*Primary Examiner* — Hau Nguyen
*Assistant Examiner* — Ryan M Gray
(74) *Attorney, Agent, or Firm* — Birch, Stewart, Kolasch & Birch, LLP

(57) ABSTRACT

The present disclosure relates to a mobile terminal and control method thereof for allowing a touch input to a three-dimensional stereoscopic image. The method disclosed herein may include displaying a three-dimensional stereoscopic image including a plurality of objects, detecting the location of a detection target in a detection region corresponding to the three-dimensional stereoscopic image, selecting a first object based on the location of the detection target, moving the first object along the movement of the detection target in a state that the first object is selected, and generating at least one object between the first and the second object when a distance between the first and the second object is increased in one direction due to the movement of the first object.

27 Claims, 24 Drawing Sheets

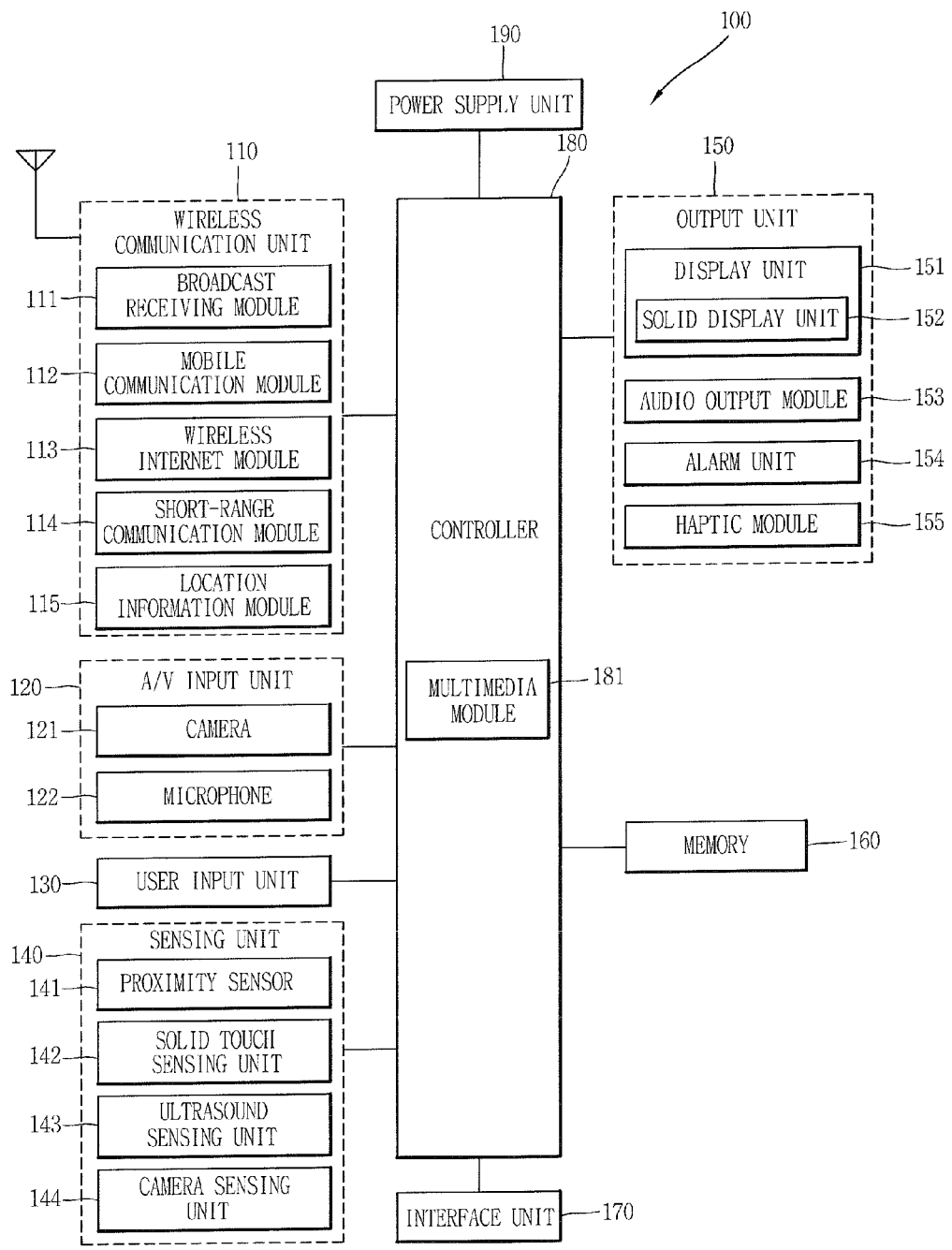

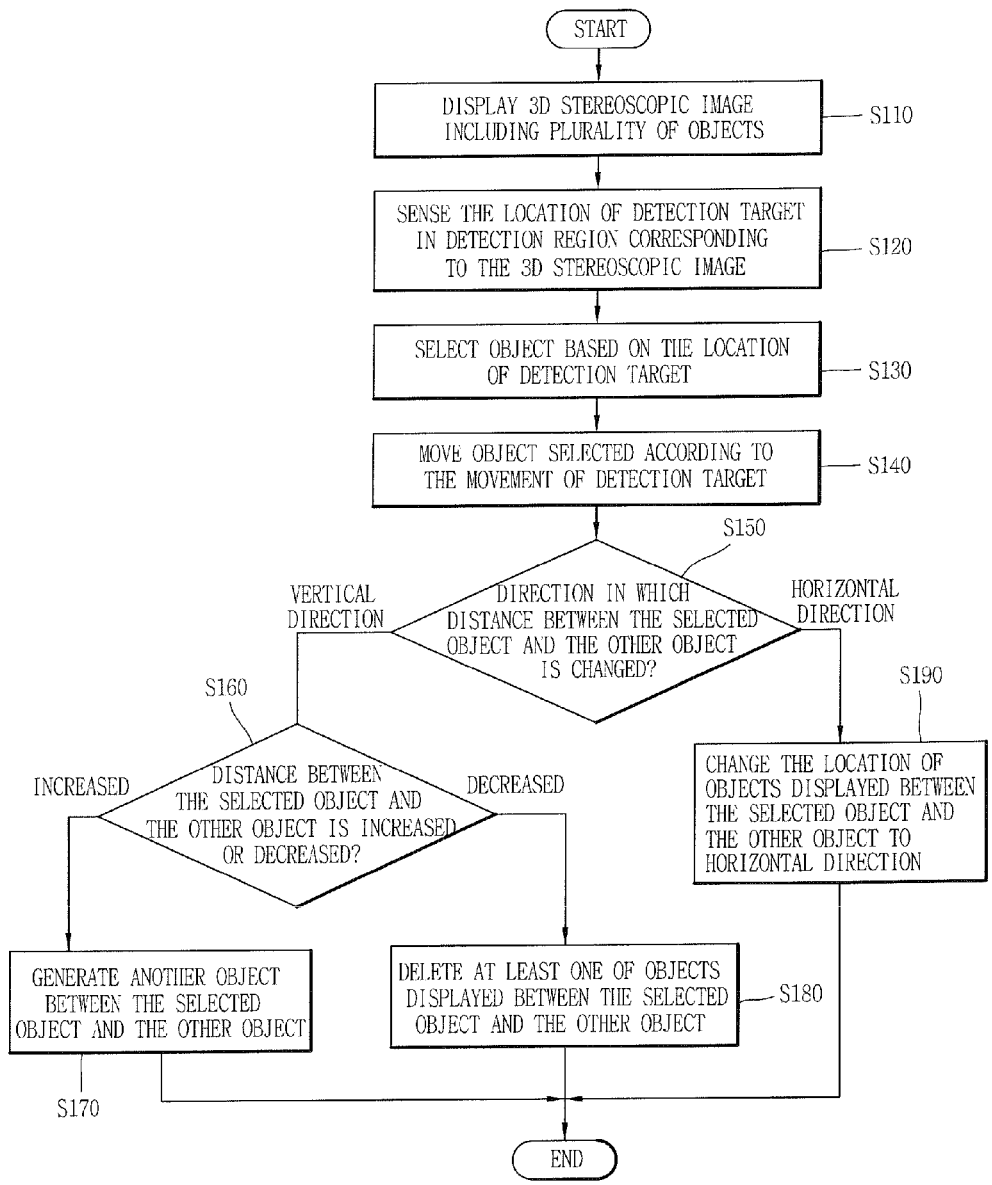

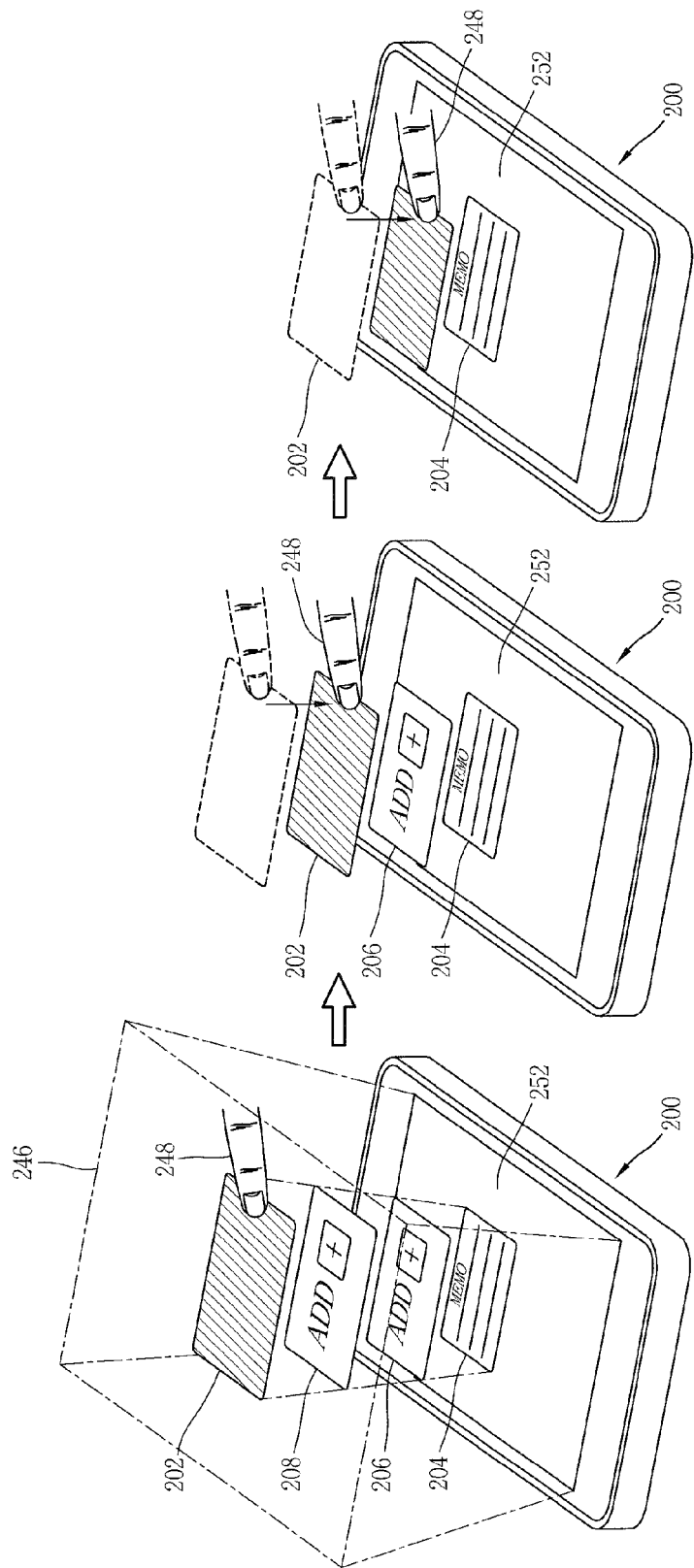

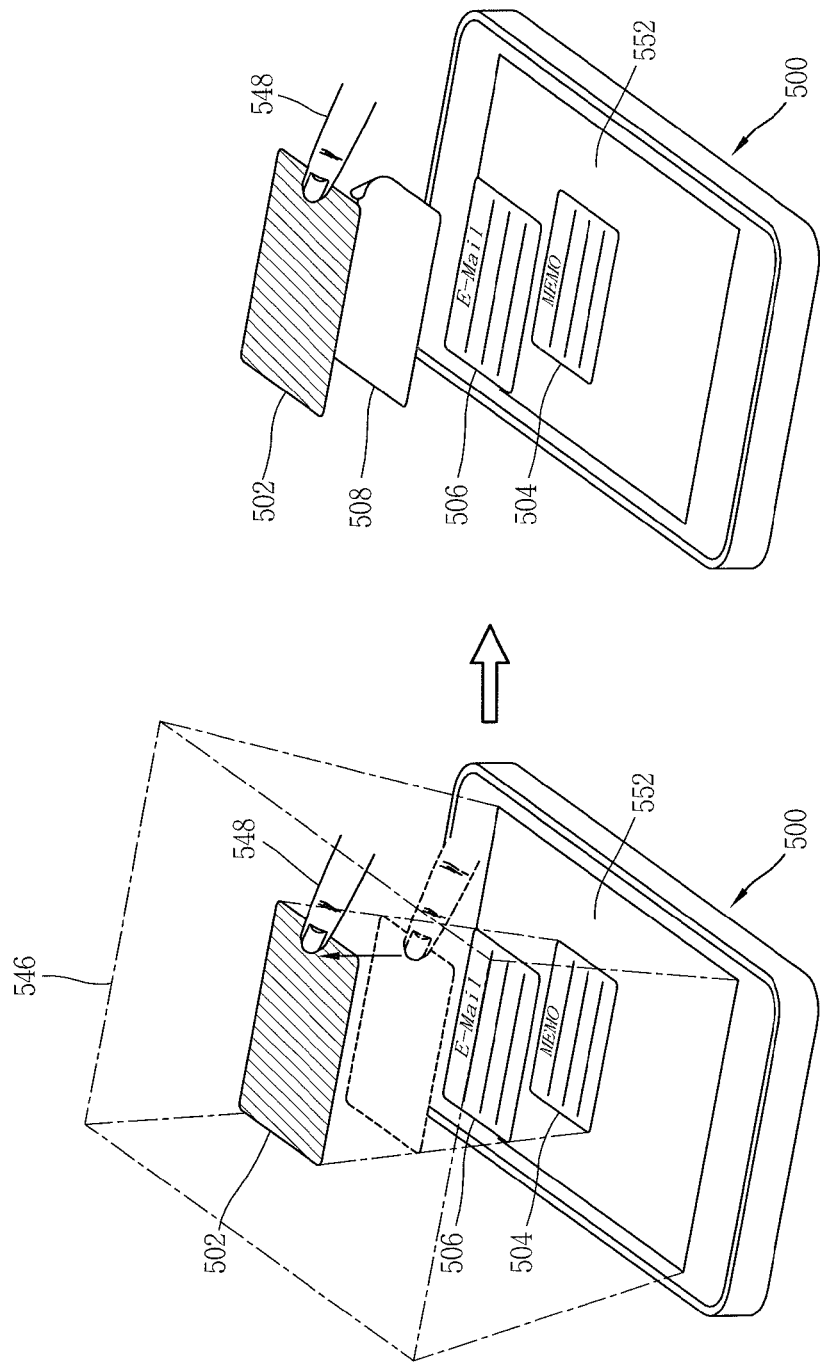

MOBILE TERMINAL AND CONTROL METHOD THEREOF

RELATED APPLICATION

Pursuant to 35 U.S.C. §119(a), this application claims the benefit of earlier filing date and right of priority to Korean Application No. 10-2011-0026589, filed on Mar. 24, 2011, the contents of which is incorporated by reference herein in its entirety.

BACKGROUND OF THE INVENTION

1. Field of the Invention

The present disclosure relates to a mobile terminal, and more particularly, to a mobile terminal and control method thereof for allowing a touch input to a three-dimensional stereoscopic image.

2. Description of the Related Art

Terminals can be classified into a mobile terminal and a stationary terminal based on its mobility. Furthermore, terminals can be further classified into a handheld terminal and a vehicle mount terminal based on whether or not it can be directly carried by a user.

As it becomes multifunctional, the mobile terminal can be allowed to capture still or moving images, play music or video files, play games, receive broadcast and the like, so as to be implemented as an integrated multimedia player. Moreover, in order to support and enhance the function of the terminal, the improvement of the terminal may be considered in the aspect of structure or software.

Owing to the improvement, terminals have evolved above the level of displaying two-dimensional stereoscopic images to display three-dimensional stereoscopic images allowing depth perception or stereovision. As a result, a user can enjoy more realistic user interfaces or contents through three-dimensional stereoscopic images.

SUMMARY OF THE INVENTION

An object of the present invention is to provide a mobile terminal and control method thereof capable of controlling objects using a distance change between the objects displayed on a three-dimensional stereoscopic image.

In addition, another object of the present invention is to provide a mobile terminal and control method thereof capable of enhance the user's convenience n controlling objects displayed on a three-dimensional stereoscopic image.

A method of controlling a mobile terminal according to an embodiment of the present invention may include displaying a three-dimensional stereoscopic image including a plurality of objects, detecting the location of a detection target in a detection region corresponding to the three-dimensional stereoscopic image, selecting a first object based on the location of the detection target, moving the first object along the movement of the detection target in a state that the first object is selected, and generating at least one object between the first and the second object when a distance between the first and the second object is increased in one direction due to the movement of the first object.

The method of controlling a mobile terminal may further include deleting at least one of objects displayed between the first and the second object when a distance between the first and the second object is decreased in one direction due to the movement of the first object.

The number of objects generated or deleted between the first and the second object may be determined by a changed distance between the first and the second object. The one direction may be a vertical direction with respect to a display unit for outputting the three-dimensional stereoscopic image.

The method of controlling a mobile terminal may further include changing the location of objects displayed between first and the second object to the other direction when a distance between the first and the second object is changed to the other direction perpendicular to the one direction.

The method of controlling a mobile terminal may further include selecting a third object based on the location of the detection target, moving the first and the third object along the movement of the detection target in a state that the first and the third object are selected, and generating at least one object between the first and the third object when a distance between the first and the third object is increased in one direction due to the movement of the first and the third object.

The method of controlling a mobile terminal may further include selecting a fourth object generated between the first and the second object based on the location of the detection target, and controlling the fourth object in a state that the fourth object is selected.

Said controlling the fourth object may include displaying a control menu associated with the fourth object, and adding a fifth object corresponding to selection information entered by using the control menu to the fourth object. Said controlling the fourth object may include deleting the fourth object in response to a delete command entered by the detection target.

The method of controlling a mobile terminal may further include changing the location of at least one of the remaining objects when the fourth object is deleted. Furthermore, the method of controlling a mobile terminal may further include generating a sixth object substituting the fourth object in a vacant region between the first and the second object when the fourth object is deleted.

Said controlling the fourth object may include moving the fourth object between the first and the second object along the movement of the detection target.

The method of controlling a mobile terminal may further include changing the location of at least one object displayed between the first and the second object when the fourth object is moved.

Said controlling the fourth object may include performing an editing operation using a clipboard when the fourth object includes the clipboard. Said controlling the fourth object may include displaying and storing data entered by using a virtual keyboard in the fourth object when the fourth object comprises the virtual keyboard. The virtual keyboard may be displayed to be inclined toward the display unit for displaying the three-dimensional stereoscopic image.

The method of controlling a mobile terminal may further include fixing the first object in response to a fix command entered by the detection target. The fix command may be entered when the detection target drags the first object out of the detection region in said fixing the first object. The fix command may be entered based on at least one of a frequency or time that the detection target touches the first object in said fixing the first object.

The method of controlling a mobile terminal may further include grouping the third and the fourth object when the third and fourth object displayed between the first and the second object are located in a grouped region within the three-dimensional stereoscopic image.

The at least one object generated between the first and the second object may include an indication reflecting an object attribute. A detection range corresponding to each object displayed on the three-dimensional stereoscopic image may be determined according to a vertical distance with respect to the each object.

A method of controlling a mobile terminal according to another embodiment of the present invention may include displaying a three-dimensional stereoscopic image including a plurality of objects on a display unit, moving a first object in a vertical direction to the display unit based on at least one of the strength, frequency, and time of a touch applied to the display unit, and generating at least one object between the first and the second object when the first object is moved in the vertical direction to increase a distance between the first and the second object.

The method of controlling a mobile terminal may further include deleting at least one of objects displayed between the first and the second object when the first object is moved in the vertical direction to decrease a distance between the first and the second object.

The method of controlling a mobile terminal may further include moving the first object in a horizontal direction to the display unit based on a drag on the display unit, and changing the location of objects displayed between the first and the second object to the horizontal direction when the first object is moved in the horizontal direction to change a distance between the first and the second object.

A mobile terminal according to an embodiment of the present invention may include a terminal body, a display unit, a detection unit, and a controller. The display unit may be formed on the terminal body, and configured to display a three-dimensional stereoscopic image including a first and a second object. The detection unit may be mounted on the terminal body to detect the location of a detection target in a detection region corresponding to the three-dimensional stereoscopic image. Furthermore, the controller may be configured to select the first object based on the location of the detection target, move the first object along the movement of the detection target in a state that the first object is selected, and generate at least one object between the first and the second object when a distance between the first and the second object is increased in one direction due to the movement of the first object.

The controller may delete at least one of objects displayed between the first and the second object when a distance between the first and the second object is decreased in one direction due to the movement of the first object.

The controller may change the location of objects displayed between first and the second object to the other direction when a distance between the first and the second object is changed to the other direction perpendicular to the one direction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment of the present invention;

FIG. 2 is a flow chart for explaining an embodiment of the control method applied to the mobile terminal illustrated in FIG. 1;

FIGS. 3A, 3B, 4A, 4B, 5A, and 5B are conceptual views illustrating operation examples according to the control method illustrated in FIG. 2;

FIGS. 13A through 13C are conceptual views illustrating a visual effect associated with an embodiment of the control method applied to a mobile terminal according to the present invention;

DETAILED DESCRIPTION OF THE INVENTION

Figure 3A:
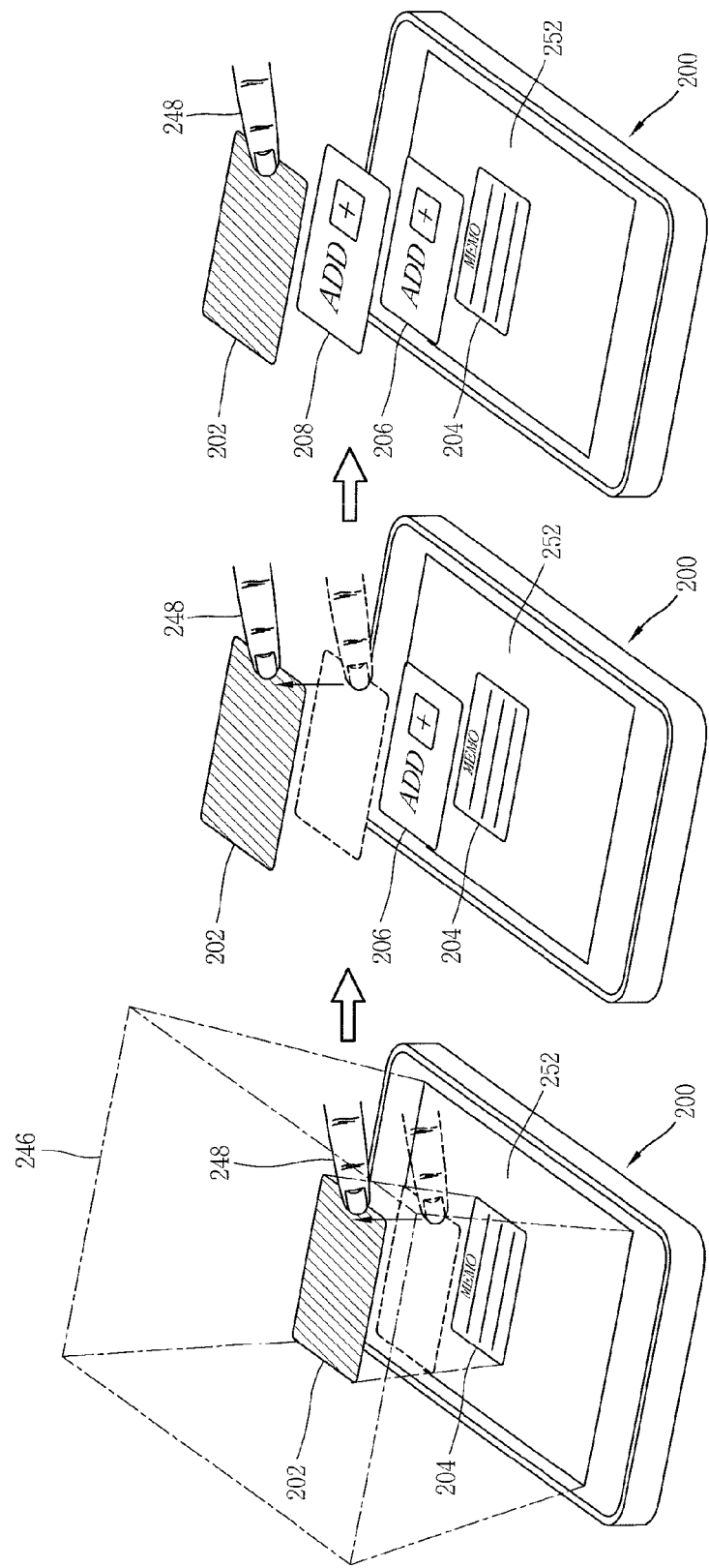

Hereinafter, an embodiment of the present invention will be described with reference to the accompanying drawings to describe in detail to the extent that the technical spirit of the present invention can be easily implemented by those skilled in the art. However, the present invention may be implemented in various forms, and not be limited to the embodiment described herein. Furthermore, the elements having no relevance to the description will be omitted to clearly describe the present invention in the drawings, and the same or similar elements are designated with the same reference numerals throughout the entire specification.

A terminal disclosed herein may include a portable phone, a smart phone, a laptop computer, a digital broadcast terminal, a personal digital assistant (PDA), a portable multimedia player (PMP), a navigator, and the like. However, it would be easily understood by those skilled in the art that a configuration disclosed herein may be applicable to stationary terminals such as a digital TV, a desktop computer, and the like, excluding constituent elements particularly configured only for a mobile terminal.

FIG. 1 is a block diagram illustrating a mobile terminal 100 associated with an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170.

The sensing unit 140 may include a proximity sensor 141, a solid touch sensing unit 142, a ultrasound sensing unit 143, and a camera sensing unit 144. The sensing unit 140 may be configured with a three-dimensional sensor for detecting the location of a subject (hereinafter, referred to as a "detection target") existing and moving in a three-dimensional detection region.

Furthermore, the sensing unit 140 may include a touch sensor (not shown) for sensing a touch operation to the display unit 151. The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the display unit 151 and a touch sensitive sensor (referred to as a touch sensor) have a layered structure therebetween, the display unit 151 may be used as an input device rather than an output device. The display unit 151 may be referred to as a "touch screen".

When there is a touch input through the touch screen, the corresponding signals are sent to a touch controller (not shown). The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection target is sensed by changes of an electromagnetic field. In this case, the touch screen may be categorized into a proximity sensor 141.

The proximity sensor 141 refers to a sensor to detect the presence or absence of a detection target using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

The proximity sensor 141 may be disposed at an inner region of the mobile terminal 100 covered by the touch screen, or adjacent to the touch screen. The proximity sensor 141 measures a distance between the detection target (for example, the user's finger or stylus pen) and the detection surface to which a touch is applied using an electromagnetic field or infrared rays without a mechanical contact. The proximity sensor 141 may recognize which portion of a stereoscopic image has been touched by using the measured distance.

On the other hand, the proximity sensor 141 may be configured to sense a touch on a three-dimensional space using a proximity level of the detection target.

The solid touch sensing unit 142 may be configured to sense the strength, frequency or duration time of a touch applied to the touch screen. For example, solid touch sensing unit 142 senses a user applied touch pressure, and if the applied pressure is strong, then the solid touch sensing unit 142 recognizes it as a touch for an object located farther from the touch screen.

The ultrasound sensing unit 143 may be configured to sense the location of the detection target using ultrasound. For example, the ultrasound sensing unit 143 may be configured with an optical sensor and a plurality of ultrasound sensors.

The optical sensor may be configured to sense light. For example, the optical sensor may be an infrared data association (IRDA) for sensing infrared rays.

The ultrasound sensor may be configured to sense ultrasound waves. A plurality of ultrasound sensors are arranged to be separated from one another, and through this configuration, the plurality of ultrasound sensors may have a time difference in sensing ultrasound waves generated from the same or adjoining point.

Ultrasound waves and light are generated from a wave generating source. The wave generating source may be provided in the detection target, for example, a stylus pen. Since light is far faster than ultrasound waves, the time for light to reach the optical sensor is far faster than the time for ultrasound waves to reach the optical sensor. Accordingly, the location of the wave generating source may be calculated by using a time difference between the light and ultrasound waves to reach the optical sensor.

The camera sensing unit 144 may include at least one of a camera, a laser sensor, and a photo sensor. For example, the camera and laser sensor may be combined to each other to sense a touch of the detection target to a three-dimensional stereoscopic image. Distance information sensed by the laser sensor is added to a two-dimensional image captured by the camera to acquire three-dimensional information.

For another example, a photo sensor may be deposited on the display element. The photo sensor may be configured to scan the motion of the detection target in proximity to the touch screen. More specifically, the photo sensor is integrated with photo diodes (PDs) and transistors in the rows and columns thereof, and a content placed on the photo sensor may be scanned by using an electrical signal that is changed according to the amount of light applied to the photo diode. In other words, the location coordinate of the detection target according to the changed amount of light may be detected through the photo sensor.

The output unit 150 is configured to provide an output associated with visual sense, auditory sense, tactile sense, and the like, and the output unit 150 may include the display unit 151, an audio output module 153, an alarm unit 153, a haptic module 153, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode is (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may be configured with a solid display unit 152 for displaying a stereoscopic image. Here, the stereoscopic image indicates a three-dimensional stereoscopic image, and the three-dimensional stereoscopic image is an image for allowing the user to feel the gradual depth and reality of an object located on the monitor or screen as in the real space.

The three-dimensional stereoscopic image may be implemented by using binocular disparity. Here, binocular disparity denotes a disparity made by the location of two eyes separated by about 65 mm, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the solid display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a three-dimensional stereoscopic image may include a left image (image for the left eye) and a right image (image for the right eye). The method of implementing a three-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a three-dimensional stereoscopic image.

As an example of the three-dimensional stereoscopic image, for three-dimensional thumbnail images, a left image thumbnail and a right image thumbnail may be generated from the left and the right image of the original image frame, and then combined with each other to generate a three-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a solid space feeling.

When the solid display unit 152 and a touch sensor are configured with an interlayer structure or the solid display unit 152 and a 3D sensor for detecting a touch operation are combined with each other, the solid display unit 152 may be used as a three-dimensional input device. The solid display unit 152 may be referred to as a "solid touch screen".

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional stereoscopic images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper portion and lower portion of the display unit, respectively. The output window and the input window may be regions allocated to output or input information, respectively. A soft key on which numerals for inputting phone numbers or the like are displayed is outputted on the input window. When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with a case where the display unit 151 and the touch pad are touched together within a predetermined period of time, one function of the mobile terminal 100 may be executed. As a case of being touched together, there is a case when the user clamps a terminal body of the mobile terminal 100 using the thumb and forefinger. For one of the functions executed in the mobile terminal 100, there may be an activation or de-activation for the display unit 151 or the touch pad.

Hereinafter, a mechanism for controlling objects using a distance change between the objects displayed on a three-dimensional stereoscopic image in the mobile terminal 100 will be described.

FIG. 2 is a flow chart for explaining an embodiment of the control method applied to the mobile terminal 100 illustrated in FIG. 1. Referring to FIG. 2, in the step S110, a three-dimensional stereoscopic image including a plurality of objects is displayed. The solid display unit 152 (refer to FIG. 1) may output a three-dimensional stereoscopic image implemented by the direct image method. The three-dimensional stereoscopic image may be implemented in the form of being protruded or sunken out of or into the mobile terminal 100 with respect to a window of the mobile terminal 100, for example, a surface of the solid display unit 152.

In the step S120, the location of the detection target is sensed in a detection region corresponding to the three-dimensional stereoscopic image. The sensing unit 140 (refer to FIG. 1) may sense a two-dimensional location of the detection target, for example, a location on a surface in parallel to the window of the mobile terminal 100. Furthermore, the sensing unit 140 may sense a three-dimensional location of the detection target, for example, a location including a vertical distance with respect to the window of the mobile terminal 100.

In the step S130, at least one of a plurality of objects included in the three-dimensional stereoscopic image may be selected based on the location of the detection target. The controller 180 may select at least one of the plurality of objects using the location information of the detection target provided from the sensing unit 140. At this time, the location of an object that has been selected in the three-dimensional stereoscopic image may correspond to the location of the detection target in a detection region.

In the step S140, the selected object is moved along the movement of the detection target. For example, when the detection target moves in one direction, the selected object may be also moved in the same direction as the moving direction of the detection target.

In the step S150, due to the movement of the selected object, it is determined to which direction a distance between the selected object and the other object is changed. As a result of the determination, when a distance between the selected object and the other object is changed to a vertical direction to the window of the mobile terminal 100 (hereinafter, referred to as a "vertical direction"), it advances to the step S160. On the contrary, when a distance between the selected object and the other object is changed to a horizontal direction to the window of the mobile terminal 100 (hereinafter, referred to as a "horizontal direction"), it advances to the step S190.

In the step S160, it is determined whether a distance between the selected object and the other object is increased or decreased. As a result of the determination, when a distance between the selected object and the other object is increased, it advances to the step S170. In the step S170, another object is generated between the selected object and the other object. On the contrary, when a distance between the selected object and the other object is decreased, it advances to the step S180. In the step S180, at least one of objects displayed between the selected object and the other object is deleted.

In the step S190, the location of objects displayed between the selected object and the other object is changed to a horizontal direction. For example, an interval of objects displayed between the selected object and the other object may be evenly controlled in a horizontal direction.

As described above, according to an embodiment of the control method applied to the mobile terminal 100 of the present invention, an object control operation may be carried out to move an object selected along the movement of the detection target in a three-dimensional space, and generate or delete at least one object according to a distance change between objects due to the movement of the selected object. Otherwise, an object control operation may be carried out to change the location (interval) of objects.

As a result, the objects of the mobile terminal 100 may be effectively controlled by using a space being changed between objects without entering any other additional command except a command associated with the movement of the selected object.

FIGS. 3A, 3B, 4A, 4B, 5A, and 5B are conceptual views illustrating operation examples according to the control method illustrated in FIG. 2.

In operation examples which will be described below, the solid display unit 252 outputs a three-dimensional stereoscopic image implemented in the form of being protruded out of the mobile terminal 200 with respect to a surface thereof. The sensing unit (not shown) senses the location of the detection target 248 in a detection region 246 corresponding to the three-dimensional stereoscopic image. The controller (not shown) controls an object displayed on the three-dimensional stereoscopic image based on the location of the detection target 248.

FIGS. 3A and 3B illustrate a case where an object 202 (hereinafter, referred to as a "first object") of the plurality of objects 202, 204 included in a three-dimensional stereoscopic image is moved in a vertical direction along the movement of the detection target 248.

Referring to FIG. 3A, when a distance between the first object 202 and the unselected object 204 (hereinafter, referred to as a "second object") is increased in a vertical direction due to the movement of the first object 202, at least one object 206, 208 is generated between the first and the second object 202, 204.

At this time, various kinds of objects may be generated between the first and the second object 202, 204 according to an operating system (OS) and application driven by the mobile terminal 200. For example, a vacant region (a region where nothing is displayed in a three-dimensional stereoscopic image), a memo pad or a vacant page in a web browser window, a clipboard, a virtual keyboard, an icon, a multimedia content, a control menu, a phone directory, a chat window, a widget, an e-book document, a spread sheet, and the like may be generated between the first and the second object 202, 204.

The number of objects displayed between the first and the second object 202, 204 may be determined by a changed distance between first and the second object 202, 204. For example, the number of the generated objects may be increased as increasing a distance between the first and the second object 202, 204.

The objects 206, 208 generated between the first and the second object 202, 204 may include an indication reflecting an object attribute. For example, as illustrated in the drawing, an add symbol may be displayed on the generated objects 206, 208 as an indication showing that an additional control is required for the generated objects 206, 208.

Referring to FIG. 3B, when a distance between the first object 202 and the second object 204 is decreased in a vertical direction due to the movement of the first object 202, at least one of objects 206, 208 displayed between the first and the second object 202, 204 is deleted.

At this time, the objects 206, 208 displayed between the first and the second object 202, 204 may be deleted according to the priority. For example, as illustrated in the drawing, the lately generated object 208 may be deleted earlier than the previously generated object 206.

Figure 4A:
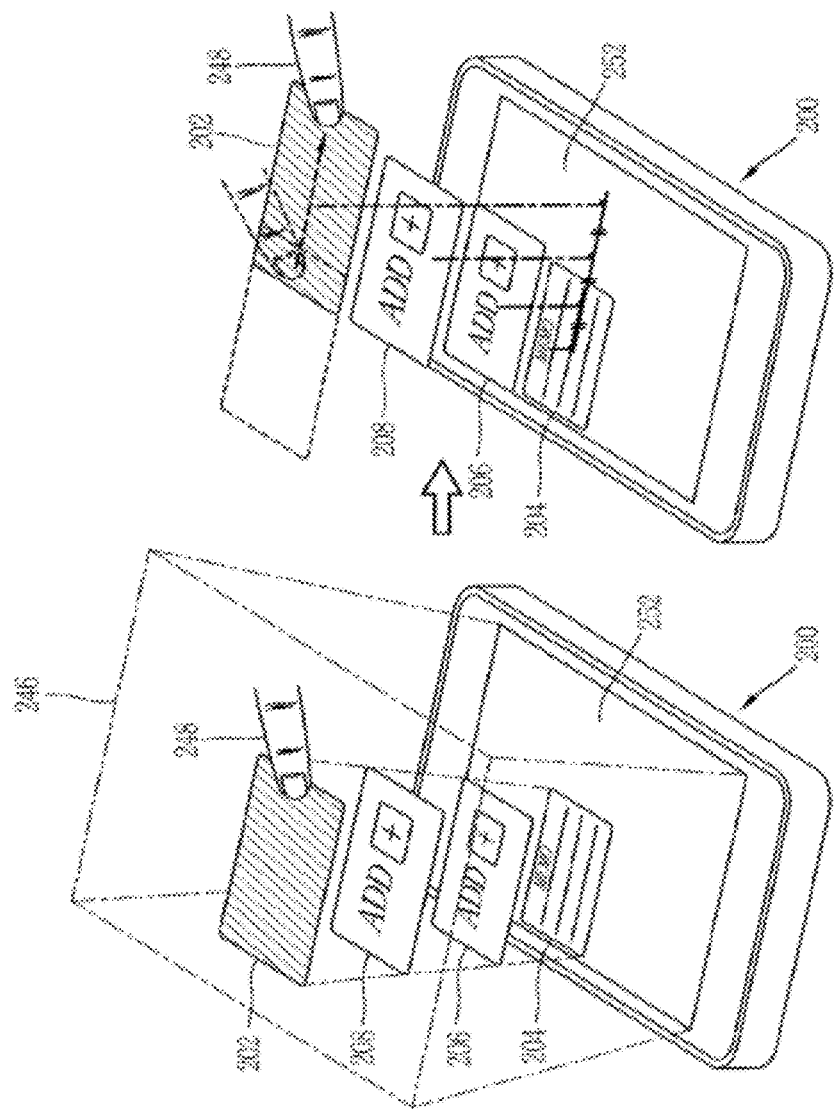
Figure 4B:
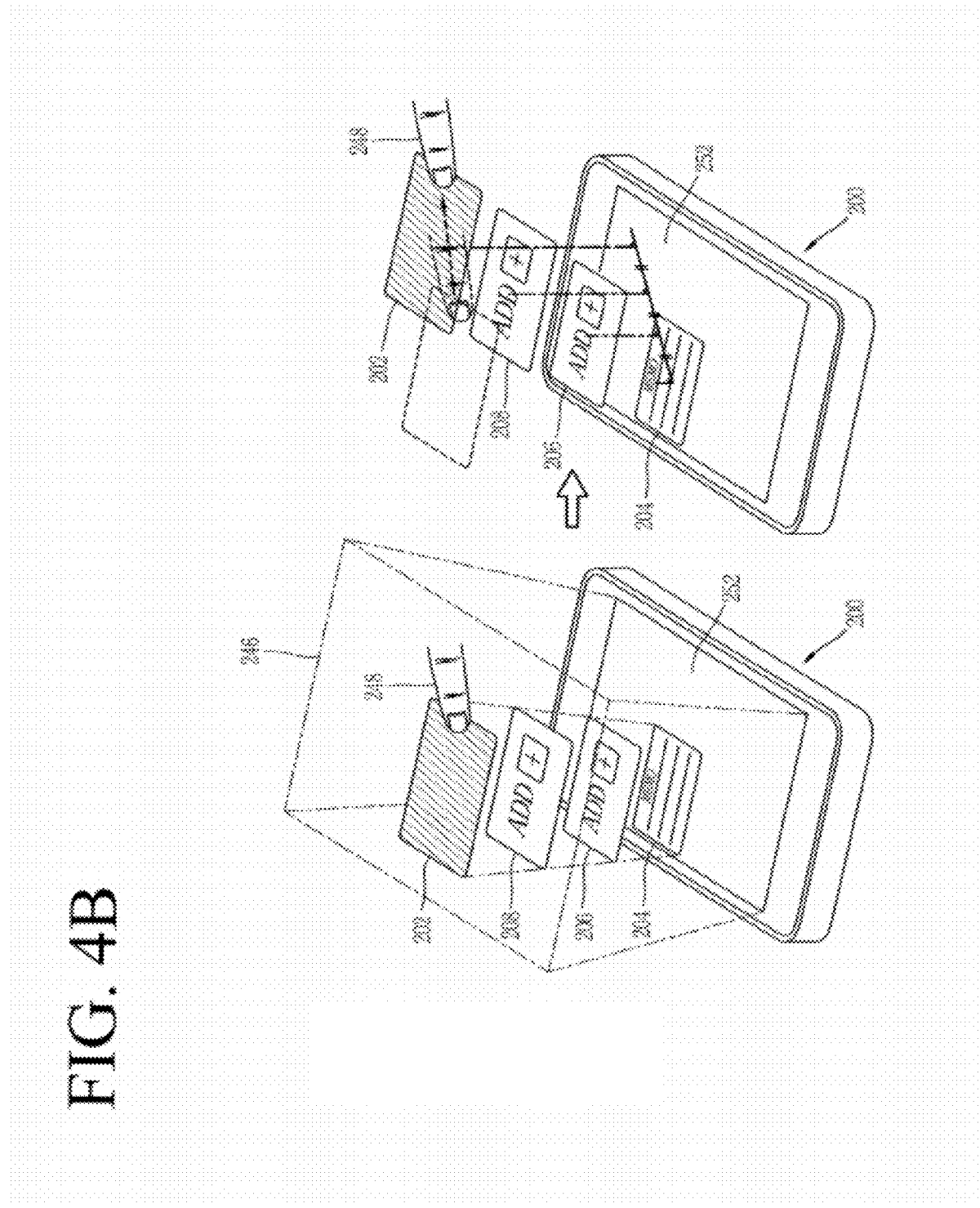

FIGS. 4A and 4B illustrate a case where the first object 202 is moved in a horizontal direction along the movement of the detection target 248. For example, FIGS. 4A and 4B illustrate a case where the first object 202 is moved in a different direction on a surface in parallel to the solid display unit 252.

Referring to FIGS. 4A and 4B, the first object 202 is moved in a horizontal direction while maintaining a vertical direction to the solid display unit 252. Then, the location of objects 206, 208 displayed between the first and the second object 202, 204 is changed to a horizontal direction along the movement of the first object 202. For example, the location of objects 206, 208 displayed between the first and the second object 202, 204 may be changed to equalize the interval of the objects 202, 204, 206, 208.

Objects 206, 208 displayed between the first and the second object 202, 204 may be objects generated by increasing a distance between the first and the second object 202, 204 in a vertical direction.

Figure 5A:
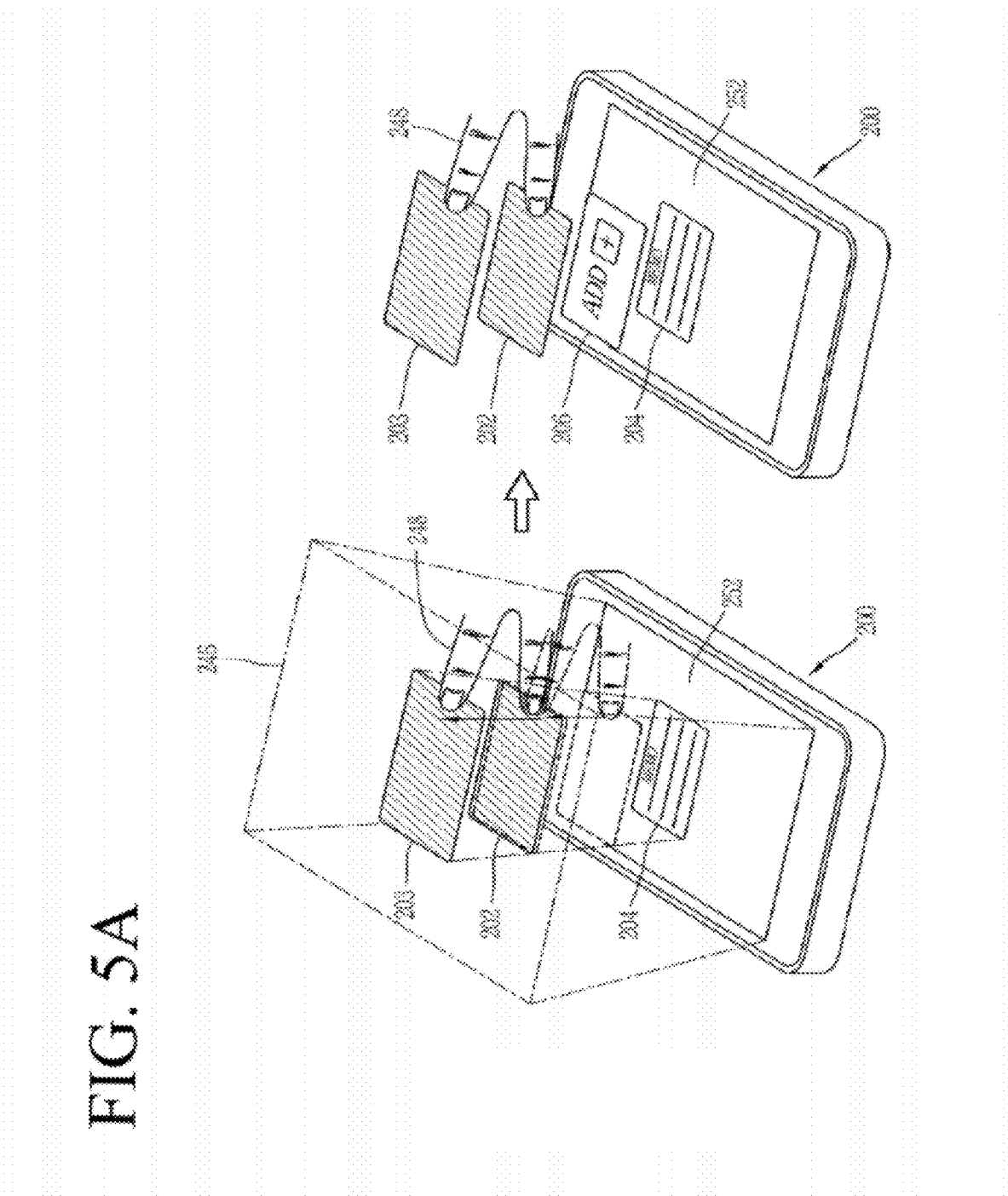
Figure 5B:
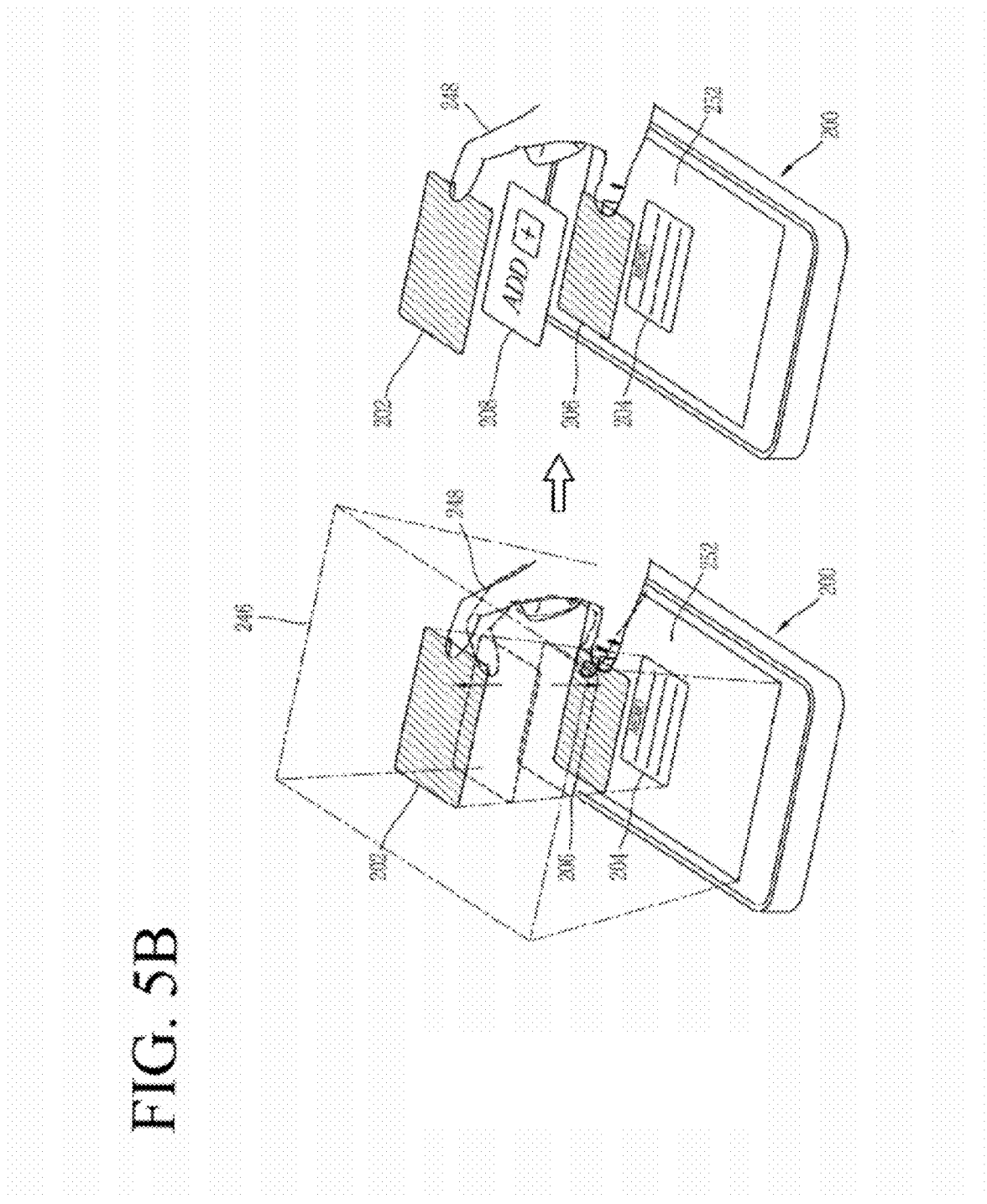

In FIGS. 5A and 5B, another selected object 203 (hereinafter, referred to as a "third object") is further illustrated in addition to the first and the second object 202, 204. FIGS. 5A and 5B illustrate a case where the first and the third object 202, 203 are moved in a vertical direction along the movement of the detection target 248. In other words, FIGS. 5A and 5B illustrate an embodiment of the control method using a multi-touch.

Referring to FIG. 5A, the first and the third object 202, 203 are moved while maintaining a vertical distance to each other along the movement of the detection target 248. Then, when a distance between either one of the first and the third object 202, 203 and the second object 204 is increased in a vertical direction due to the movement of the first and the third object 202, 203, at least one object 206 is generated between either one of the first and the third object 202, 203 and the second object 204. For example, at least one object 206 may be generated between the first and the second object 202, 204 as illustrated in the drawing.

Referring to FIG. 5B, the first and the third object 202, 203 are moved in the direction of being drawn away from each other along the movement of the detection target 248. Then, when a distance between the first and the third object 202, 203 is increased in a vertical direction due to the movement of the first and the third object 202, 203, at least one object 206 is generated between the first and the third object 202, 203.

Figure 6:
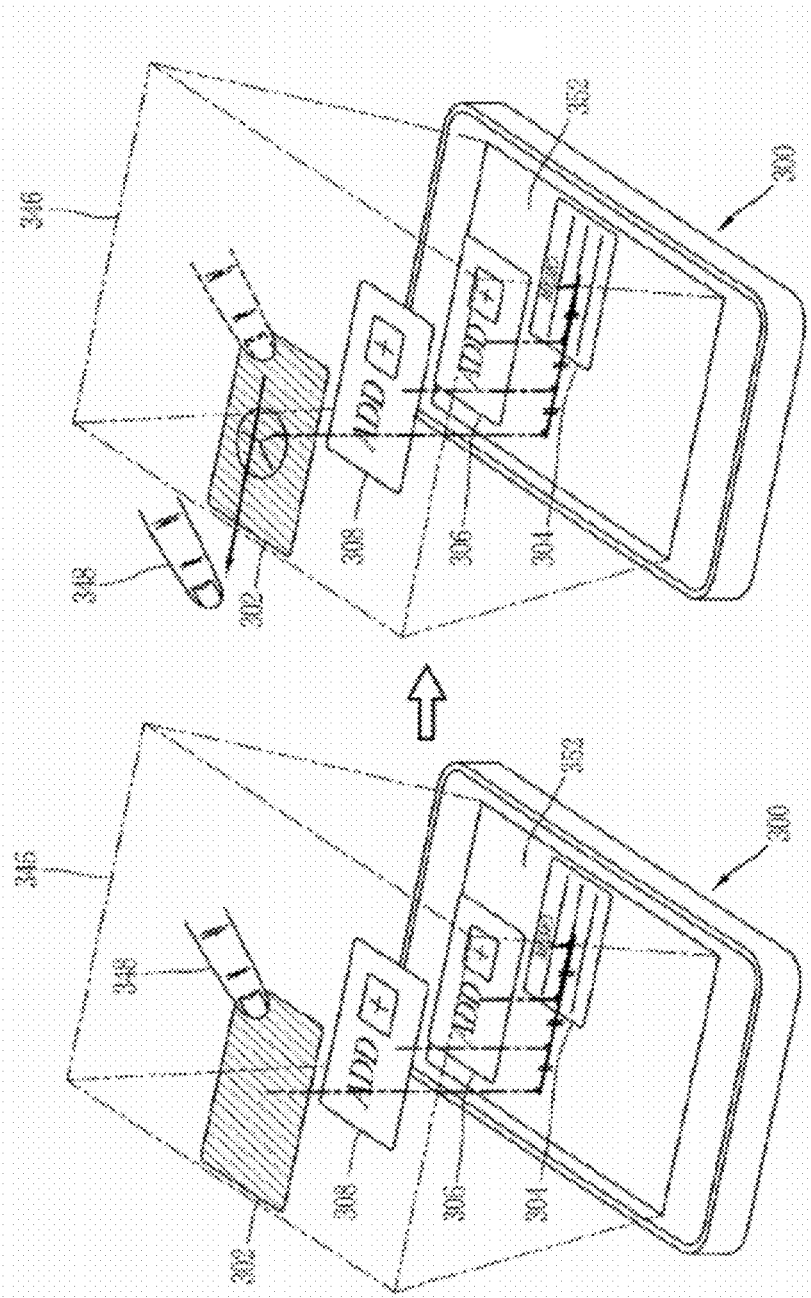
FIG. 6 is a conceptual view illustrating a case where an object fix mode associated with the control method illustrated in FIG. 2 is carried out in an exemplary manner.

FIG. 6 is a conceptual view illustrating a case where an object fix mode associated with the control method illustrated in FIG. 2 is carried out in an exemplary manner. Here, the object fix mode denotes a mode in which an object attribute is changed to fix the location of the selected object even when the detection target is moved.

Referring to FIG. 6, the first object 302 is fixed in response to a fix command entered by the detection target 348. More specifically, the fix command is entered when the detection target 348 drags the first object 302 out of the detection region 346, and the first object 302 is fixed in response to the fix command. At this time, the first object 302 is moved along the movement of the first object 302 until receiving a fix command.

Though not shown in the drawing, a fix command may be entered by using a select key. Otherwise, the fix command may be entered based on at least one of a touch frequency and time of the detection target 348 to the first object 302.

When an object fix mode is carried out, an indication indicating that the first object 302 is fixed may be displayed on the first object 302.

According to an embodiment of the present invention, subsequent to performing an object fix mode, an additional operation for the objects 306, 308 displayed between the first and the second object 302, 304 may be carried out. Hereinafter, an object control operation carried out subsequent to controlling objects according to the control method illustrated in FIG. 2 to enhance the user's convenience will be described.

FIGS. 7 through 12 are conceptual views illustrating the embodiments of an additional object control method associated with the control method illustrated in FIG. 2. In the embodiments described with reference to FIGS. 7 through 11, the solid display unit 452 of the mobile terminal 400 may output a three-dimensional stereoscopic image including a first through a fourth object 402, 404, 406, 408. Here, the third and the fourth object 406, 408 denote objects generated between the first and the second object 402, 404 as a distance between the first and the second object 402, 404 is increased in a vertical direction. In other words, the third object 406 described herein is different from the third object 203 in FIGS. 5A and 5B.

Figure 7:
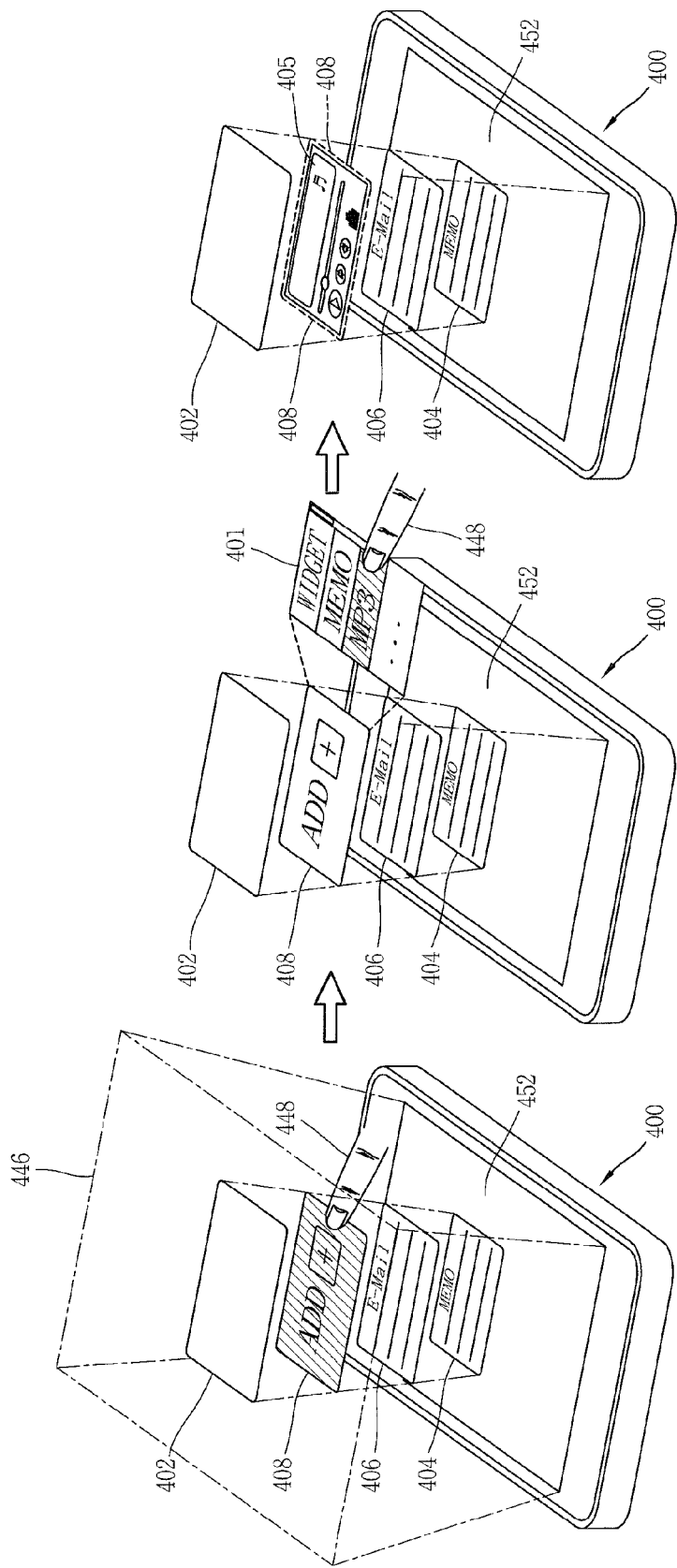
FIGS. 7 through 12 are conceptual views illustrating the embodiments of an additional object control method associated with the control method illustrated in FIG. 2.

Referring to FIG. 7, the fourth object 408 is selected based on the location of the detection target 448 in a detection region 446. When the fourth object 408 is selected, a control menu 401 associated with the fourth object 408 is displayed on a three-dimensional stereoscopic image.

The control menu 401 may include a list for candidate objects such as a widget, a memo pad, an MP3 player, and the like. Here, the names of candidate objects displayed on a list of the control menu 401 may be scrolled.

One object 405 (hereinafter, referred to as a "fifth object") of the candidate objects, for example, an MP3 player, may be selected according to the selection information entered by using the control menu 401. Then, the fifth object 405 corresponding to the selection information entered by using the control menu 401 may be added to the fourth object 408.

Figure 8:
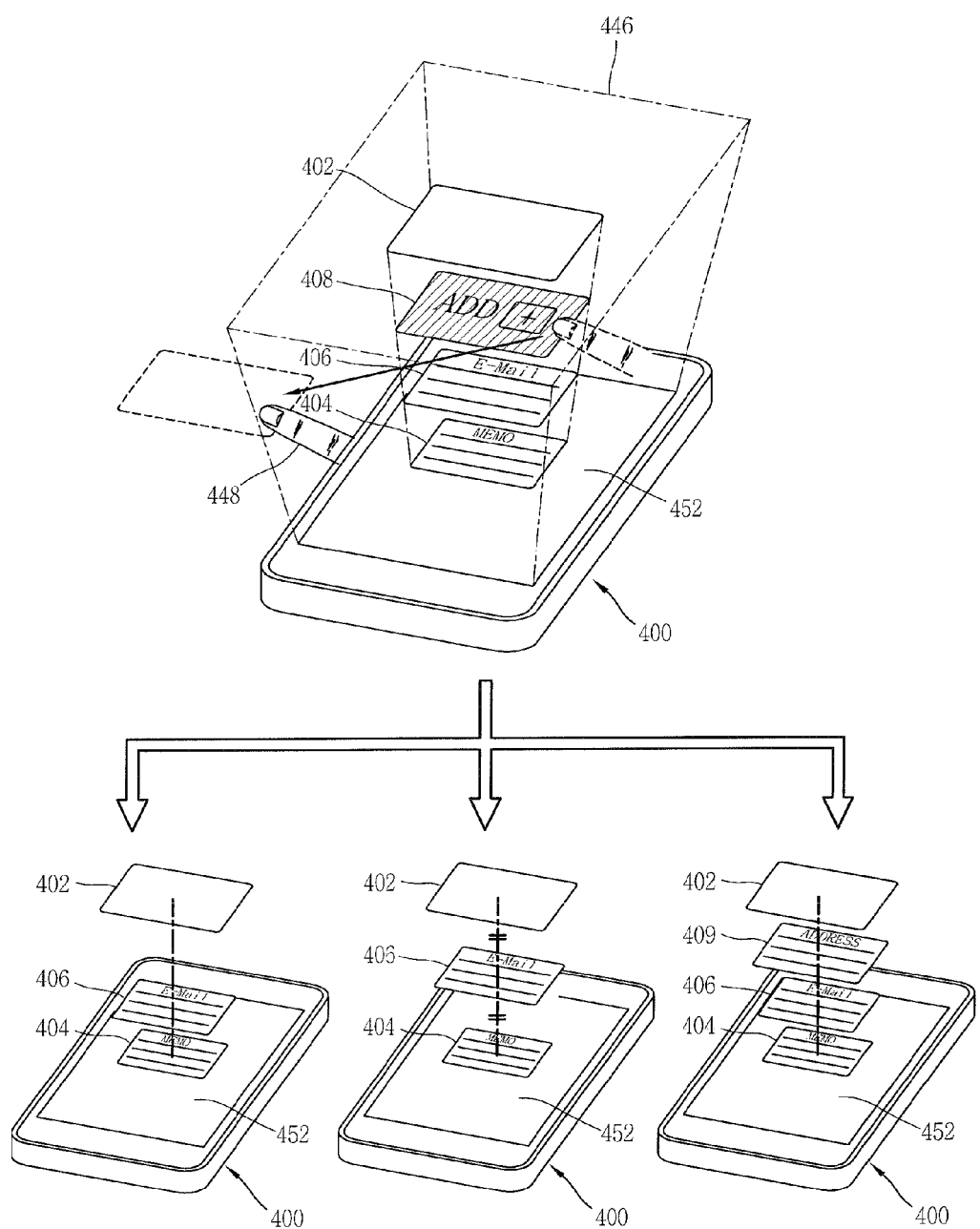

Referring to FIG. 8, the fourth object 408 is deleted in response to a delete command entered by the detection target 448. More specifically, the delete command is entered when the detection target 448 drags the fourth object 408 out of the detection region 446, and the fourth object 408 is deleted in response to the delete command.

When the fourth object 408 is deleted, the location at which the fourth object 408 is deleted may remain as a vacant region, or an additional control operation may be carried out. For example, when the fourth object 408 is deleted, the location of at least one of the remaining first through third objects 402, 404, 406 is changed. More specifically, the location of the third object 406 displayed between first and the second object 402, 404 may be changed to equalize the interval of the remaining first through third objects 402, 404, 406.

For another example, when the fourth object 408 is deleted, a sixth object 409 substituting the fourth object 408 may be generated in a vacant region between the first and the second object 402, 404. Here, the sixth object 409 may be an object associated with the adjoining object. For example, the sixth object 409 may be an address book associated with e-mails. The vacant region between the first and the second object 402, 404 may correspond to the location at which the fourth object 408 has been located prior to deletion.

Figure 9:
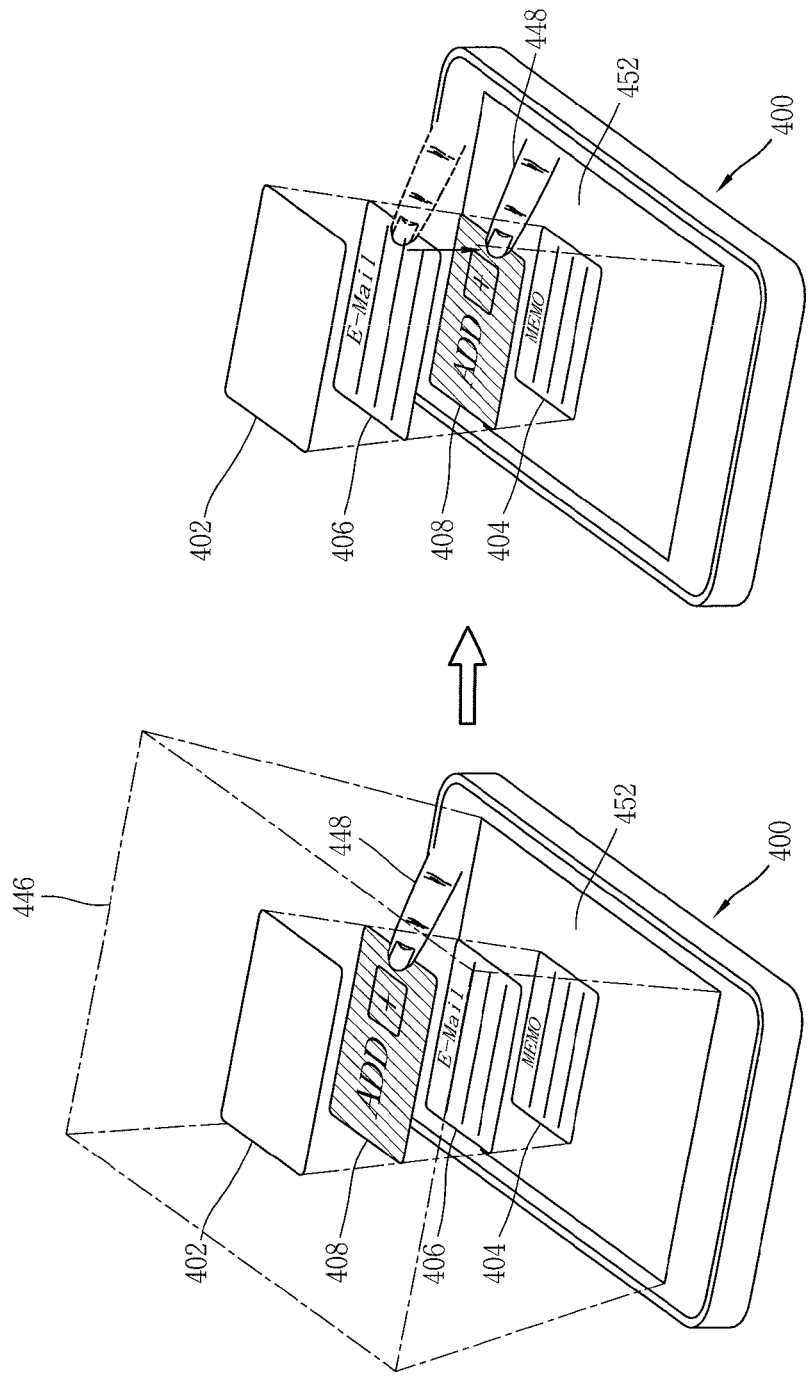

Referring to FIG. 9, the fourth object 408 is moved between the first and the second object 402, 404 along the movement of the detection target 448. Then, when the fourth object 408 is moved, the location of at least one of objects displayed between the first and the second object 402, 404 is changed. For example, when the fourth object 408 is moved to a place at which the third object 406 is located, the location of the third and the fourth object 406, 408 may be changed to each other.

Figure 10:
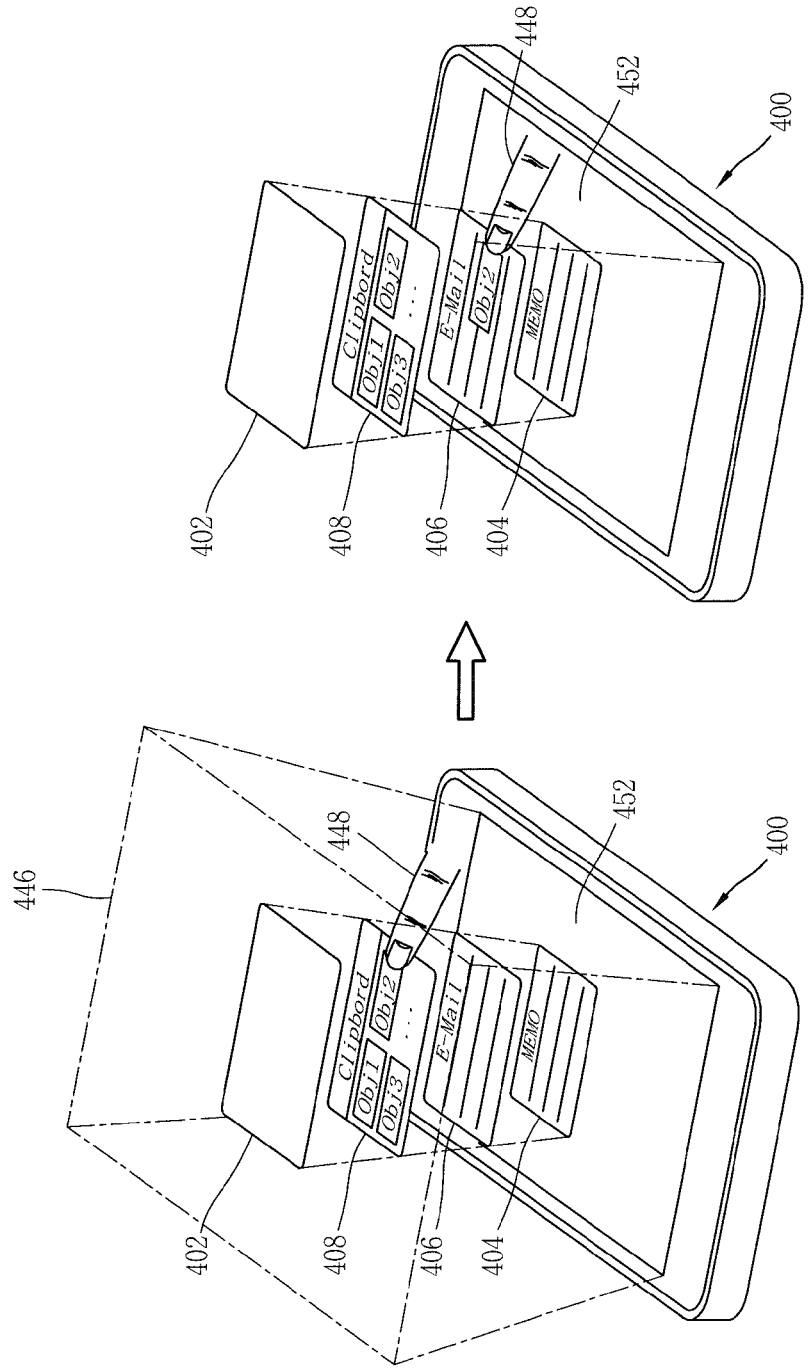

Referring to FIG. 10, the fourth object 408 may include a clipboard. The clipboard may store various objects (Obj1-Obj3) such as a text, an image, and the like. An editing operation such as copy, cut, paste, or the like may be carried out by using the clipboard. For example, any one object (Obj2) stored within a clipboard is copied in response to a copy command entered by the detection target 448, and the copied object (obj2) may be pasted to the third object 406 in response to a paste command entered by the detection target 448.

Figure 11:
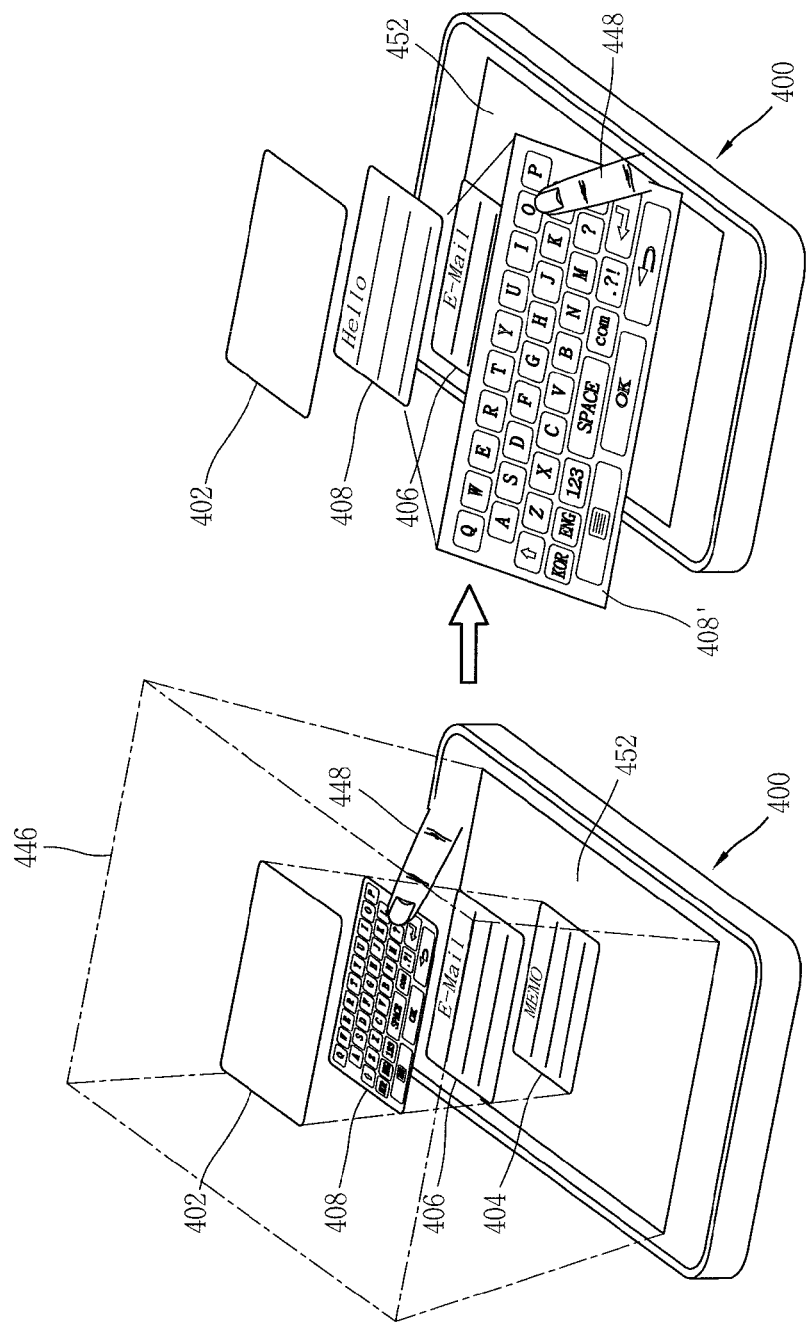

Referring to FIG. 11, the fourth object 408 may include a virtual keyboard 408'. When the fourth object 408 includes a virtual keyboard 408', data entered by using the virtual keyboard 408' may be displayed and stored in the fourth object 408.

More specifically, when a touch of the detection target 448 to the fourth object 408 is sensed, the virtual keyboard 408' is enlarged and popped up, and data may be entered by using the virtual keyboard 408'. At this time, the fourth object 408 may be displayed to be inclined toward the solid display unit 452.

Figure 12:
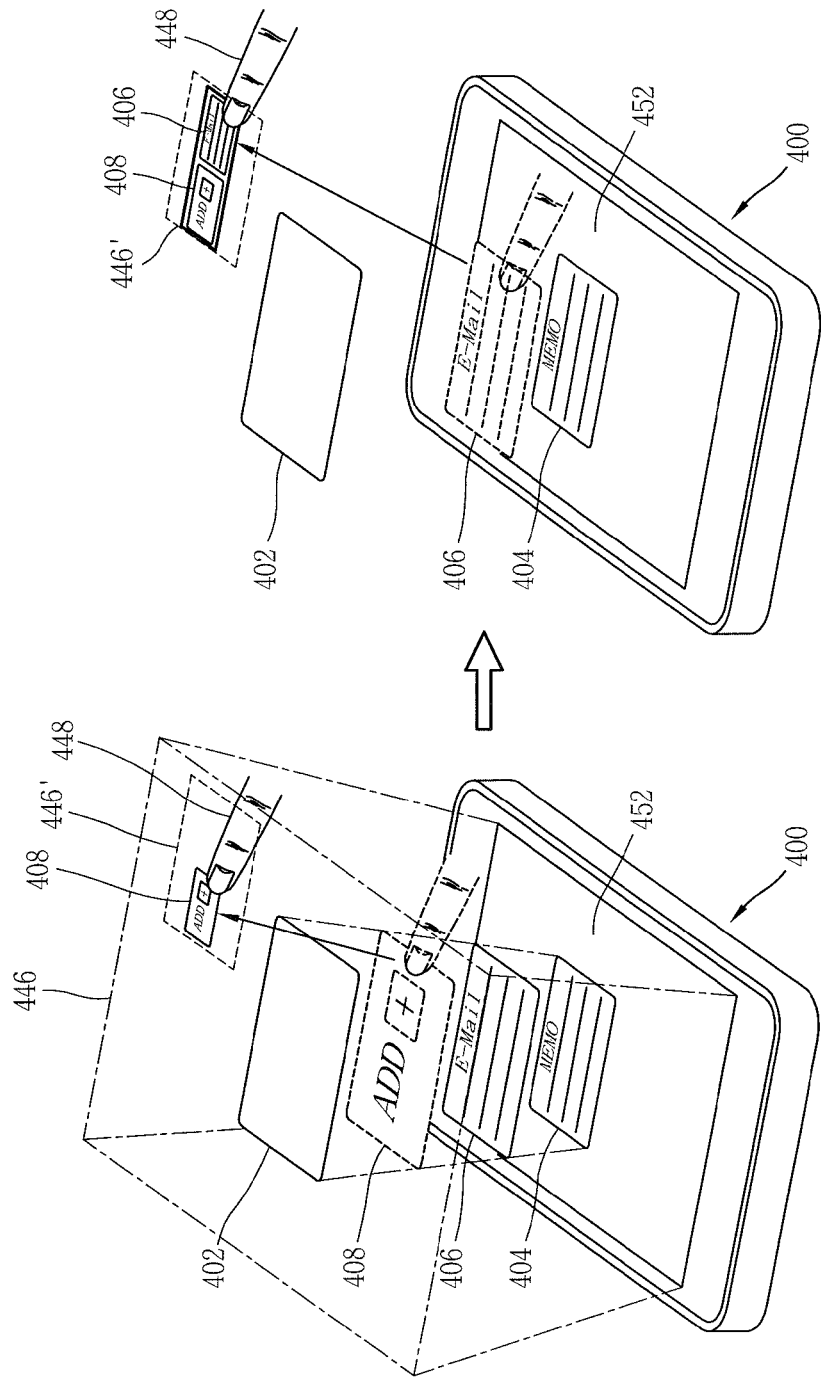

Referring to FIG. 12, the third and the fourth object 406, 408 displayed between the first and the second object 402, 404 may be combined into a group. More specifically, when the detection target 448 drags the third and the fourth object 406, 408 to a grouped region 446' within the detection region 446, and as a result, the third and the fourth object 406, 408 are combined into a group when the third and the fourth object 406, 408 are located in the grouped region 446'.

For example, when the fourth object 408 is moved to the grouped region 446' by a drag of the detection target 448, and then the third object 406 is moved to the grouped region 446' by a drag of the detection target 448 and as a result the third and the fourth object 406, 408 are located adjacent to each other, the third and the fourth object 406, 408 may be combined into a group.

As described above, the user's convenience can be enhanced in controlling objects displayed in a three-dimensional stereoscopic image by supporting an additional control such as add, delete, group, edit, input operation and the like.

Figure 13B:
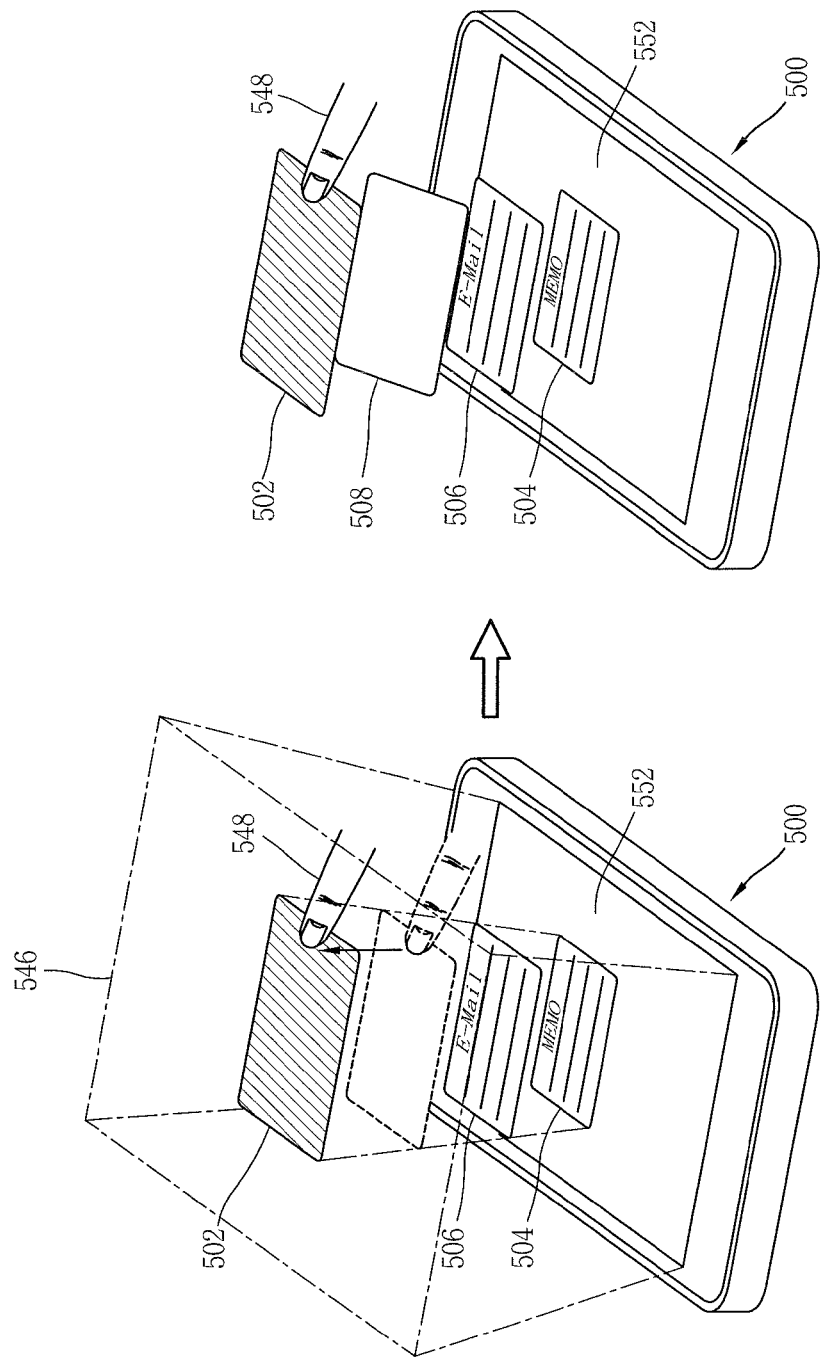
Figure 13C:
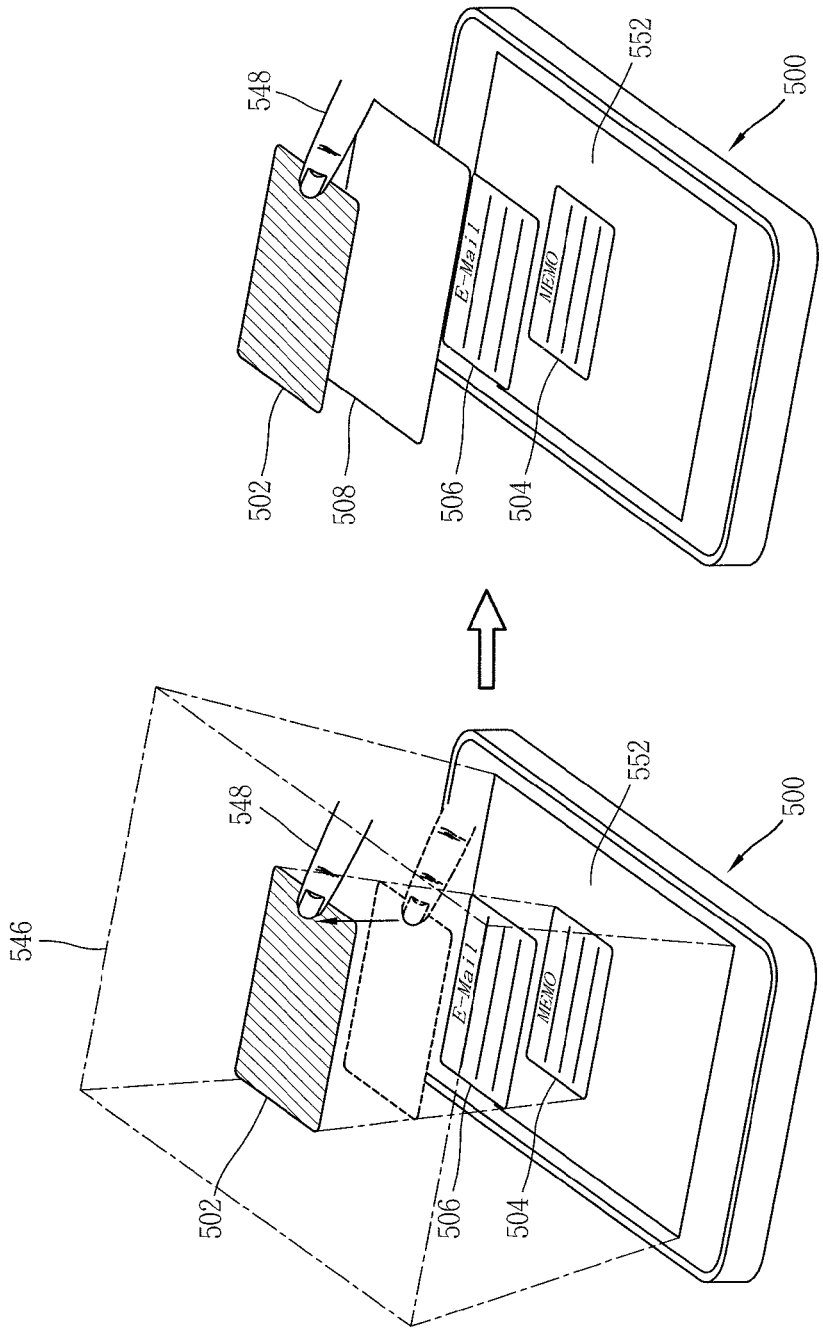

FIGS. 13A through 13C are conceptual views illustrating a visual effect associated with an embodiment of the control method applied to a mobile terminal according to the present invention.

In an embodiment described with reference to FIGS. 13A through 13C, a solid display unit 552 of the mobile terminal 500 may output a three-dimensional stereoscopic image including a first and a second object 502, 504. When a distance between the first and the second object 502, 504 is increased in a vertical direction due to the movement of the first object 502, the third object 506 is generated between the first and the second object 502, 504.

As a visual effect of illustrating that the third object 506 is an object generated by controlling the first object 502, part of the third object 506 may be displayed to be folded as illustrated in FIG. 13A, and the third object 506 may be displayed to be inclined toward the solid display unit 552 as illustrated in FIG. 13B, and the third object 506 may be displayed to be enlarged in a two-dimensional manner as illustrated in FIG. 13C.

Though not shown in the drawing, as a visual effect of illustrating that the third object 506 is an object generated by controlling the first object 502, it may be possible to change the shape, format, transparency, background color, text color, and the like in various manner for the third object 506, or also give an effect such as highlight, underline, edge highlight, and the like for the third object 506. Furthermore, information such as page number, graph, gauge numerical value, and the like may be displayed on the third object 506.

Figure 14A:
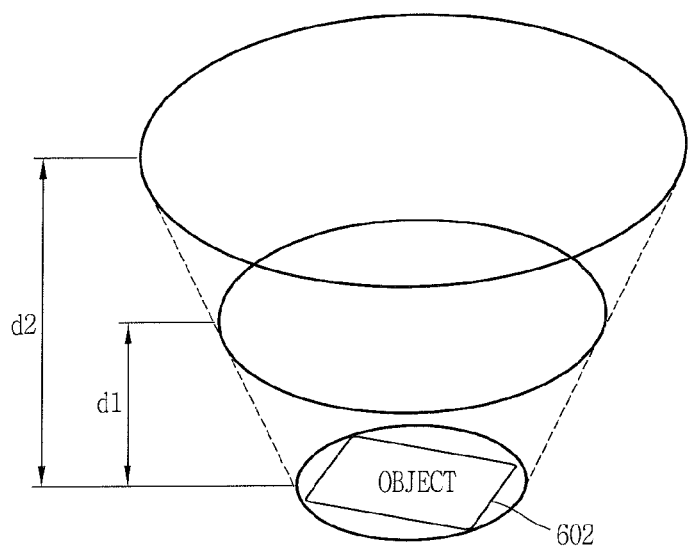
FIGS. 14A and 14B are conceptual views illustrating an object detection range associated with an embodiment of the control method applied to a mobile terminal according to the present invention.
Figure 14B:
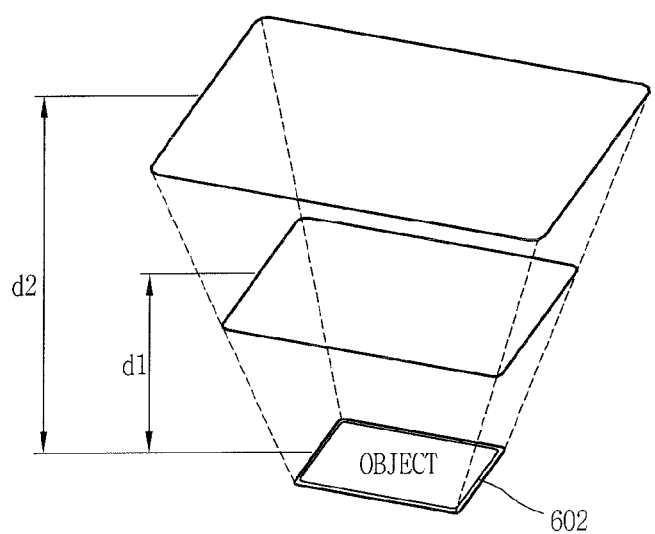

FIGS. 14A and 14B are conceptual views illustrating an object detection range associated with an embodiment of the control method applied to a mobile terminal according to the present invention.

Referring to FIGS. 14A and 14B, when the sensing unit of the mobile terminal senses a detection target, a detection region corresponding to any one object 602 displayed in a three-dimensional stereoscopic image may be determined according to a vertical distance for the object 602. For example, the detection region may become wider as being drawn away from the object 602, and become narrower as being drawn near to the object 602. Accordingly, the detection region on a plane located away from the object 602 by a first vertical distance (d1), is narrower than the detection region on a plane located away by a second vertical distance (d2).

On the other hand, the shape of the detection region according to a vertical distance with respect to the object 602 may be a circle as illustrated in FIG. 14A, or a rectangle as illustrated in FIG. 14B. However, the shape of the detection region may not be limited to this and implemented in a various manner.

Figure 15:
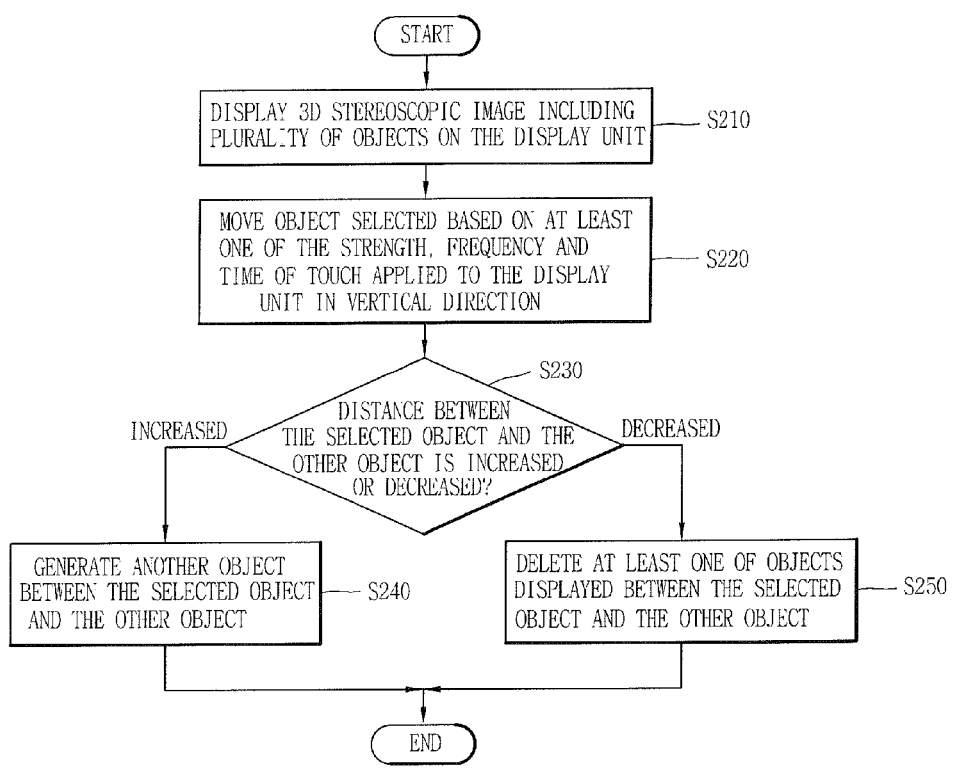
FIG. 15 is a flow chart for explaining another embodiment of the control method applied to the mobile terminal illustrated in FIG. 1.

FIG. 15 is a flow chart for explaining another embodiment of the control method applied to the mobile terminal 100 illustrated in FIG. 1. Hereinafter, redundant description that has been already made in the control method illustrated in FIG. 2 will be omitted.

Referring to FIG. 15, a three-dimensional stereoscopic image including a plurality of objects is displayed on the solid display unit 152 (refer to FIG. 1) in the step S210.

In the step S220, an object selected from the plurality of objects is moved in a vertical direction based on at least one of the strength, frequency, and time of a touch applied to the solid display unit 152. For example, an object selected according to the frequency of the touch applied to the solid display unit 152 may be drawn away from the solid display unit 152. For another example, an object selected according to the time of the touch applied to the solid display unit 152 may be drawn near to the solid display unit 152.

In the step S230, it may be determined whether a distance between the selected object and the other object is increased or decreased. As a result of the determination, when a distance between the selected object and the other object is increased, it advances to the step S240. In the step S240, another object is generated between the selected object and the other object. On the contrary, when a distance between the selected object and the other object is decreased, and it advances to the step S250. In the step S250, at least one of objects displayed between the selected object and the other object is deleted.

As described above, according to another embodiment of the control method applied to the mobile terminal 100 of present invention, it may be possible to perform an object control operation for moving the selected object in a vertical direction, and then generating or deleting at least one object according to the movement of the selected object.

Figure 16A:
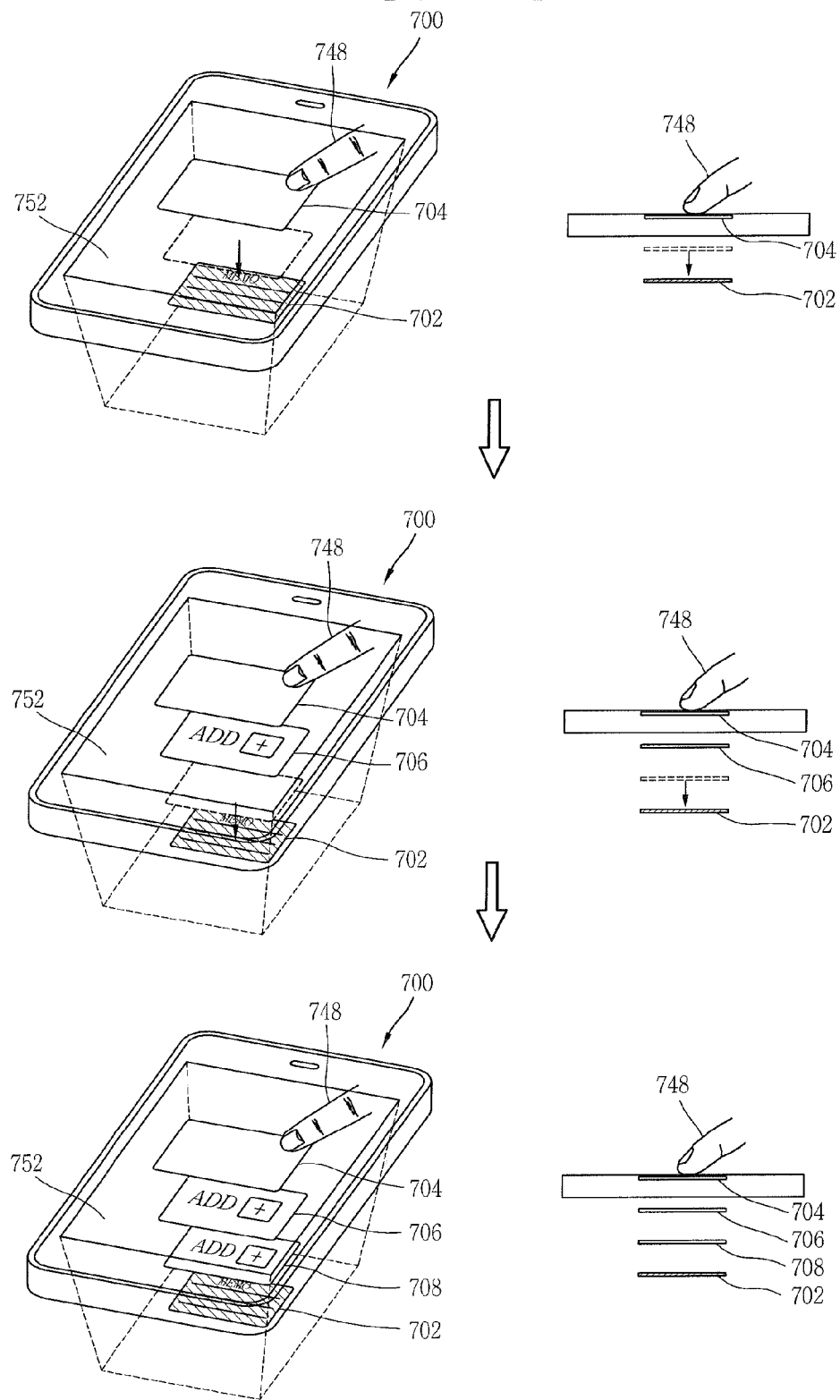
FIGS. 16A and 16B are conceptual views illustrating operation examples according to the control method illustrated in FIG. 15.
Figure 16B:
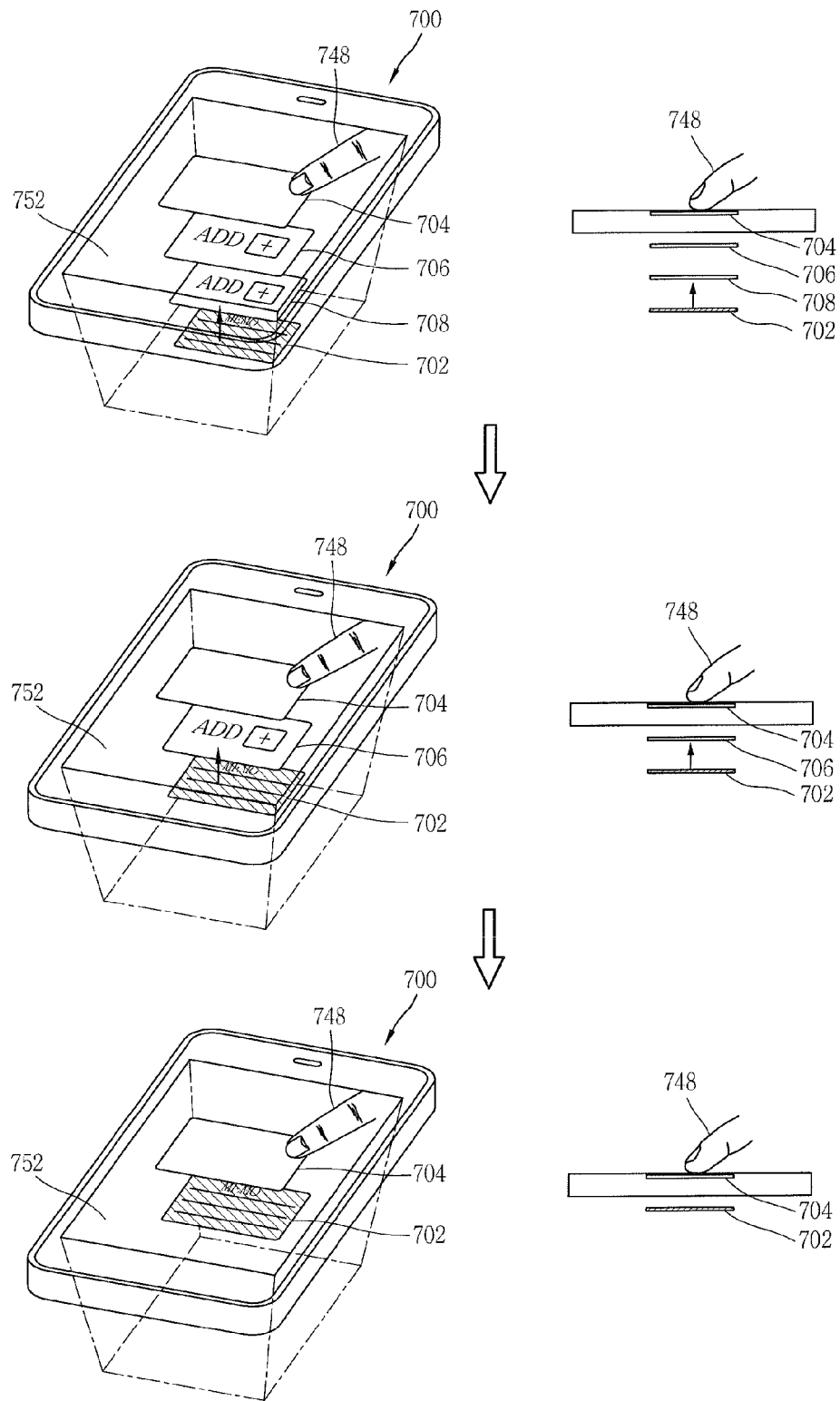

FIGS. 16A and 16B are conceptual views illustrating operation examples according to the control method illustrated in FIG. 15.

In operation examples described below, the solid display unit 752 may output a three-dimensional stereoscopic image implemented in the form of being sunken into the mobile terminal 700 with respect to a surface thereof. The sensing unit (not shown) senses a touch on the solid display unit 752. The controller (not shown) controls objects displayed on the three-dimensional stereoscopic image based on the sensed touch.

FIGS. 16A and 16B illustrate a case where the first object 702 is moved in a vertical direction based on at least one of the strength, frequency, and time of a touch applied to the solid display unit 752. For example, as the frequency of the touch applied to the solid display unit 752 is increased, the first object 702 may be drawn away from the solid display unit 752. For another example, as the time of the touch applied to the solid display unit 752 is increased, the first object 702 may be drawn near to the solid display unit 752.

Referring to FIG. 16A, when a distance between the first and the second object 702, 704 is increased in a vertical direction due to the movement of the first object 702, at least one object 706, 708 is generated between the first and the second object 702, 704.

Referring to FIG. 16B, when a distance between the first and the second object 702, 704 is decreased in a vertical direction due to the movement of the first object 702, at least one of the objects 706, 708 displayed between the first and the second object 702, 704 is deleted.

At this time, the objects 706, 708 displayed between the first and the second object 702, 704 may be deleted according to the priority. For example, as illustrated in the drawing, the lately generated object 708 may be deleted earlier than the previously generated object 706.

Figure 17:
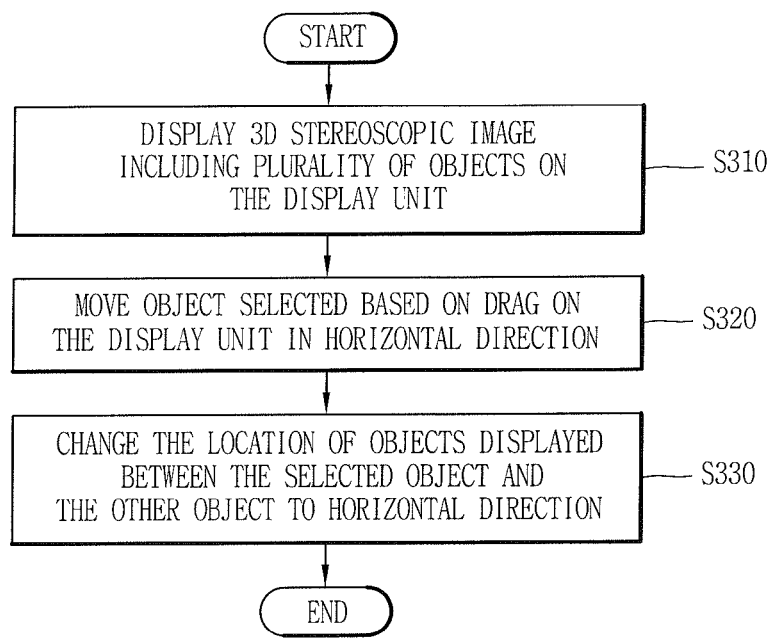
FIG. 17 is a flow chart for explaining still another embodiment of the control method applied to the mobile terminal illustrated in FIG. 1.

FIG. 17 is a flow chart for explaining still another embodiment of the control method applied to the mobile terminal 100 illustrated in FIG. 1. Hereinafter, redundant description that has been already made in the control method illustrated in FIG. 2 will be omitted.

Referring to FIG. 17, in the step S130, a three-dimensional stereoscopic image including a plurality of objects is displayed on the solid display unit 152 (refer to FIG. 1).

In the step S320, an object selected among the plurality of objects is moved in a horizontal direction based on a drag on the solid display unit 152. For example, the selected object may be drawn away from or drawn near to the solid display unit 152 in the same direction as a drag direction on the solid display unit 152.

In the step S330, when a distance between the selected object and the other object is changed to a horizontal direction due to the movement of the selected object, the location of objects displayed between the selected object and the other object is changed to a horizontal direction. For example, the interval of objects displayed between the selected object and the other object may be evenly controlled in a horizontal direction.

As described above, according to still another embodiment of the control method applied to the mobile terminal 100 of present invention, it may be possible to perform an object control operation for moving the selected object in a horizontal direction using a drag on the solid display unit 152, and then changing the location (interval) of objects according to the movement of the selected object.

Figure 18:
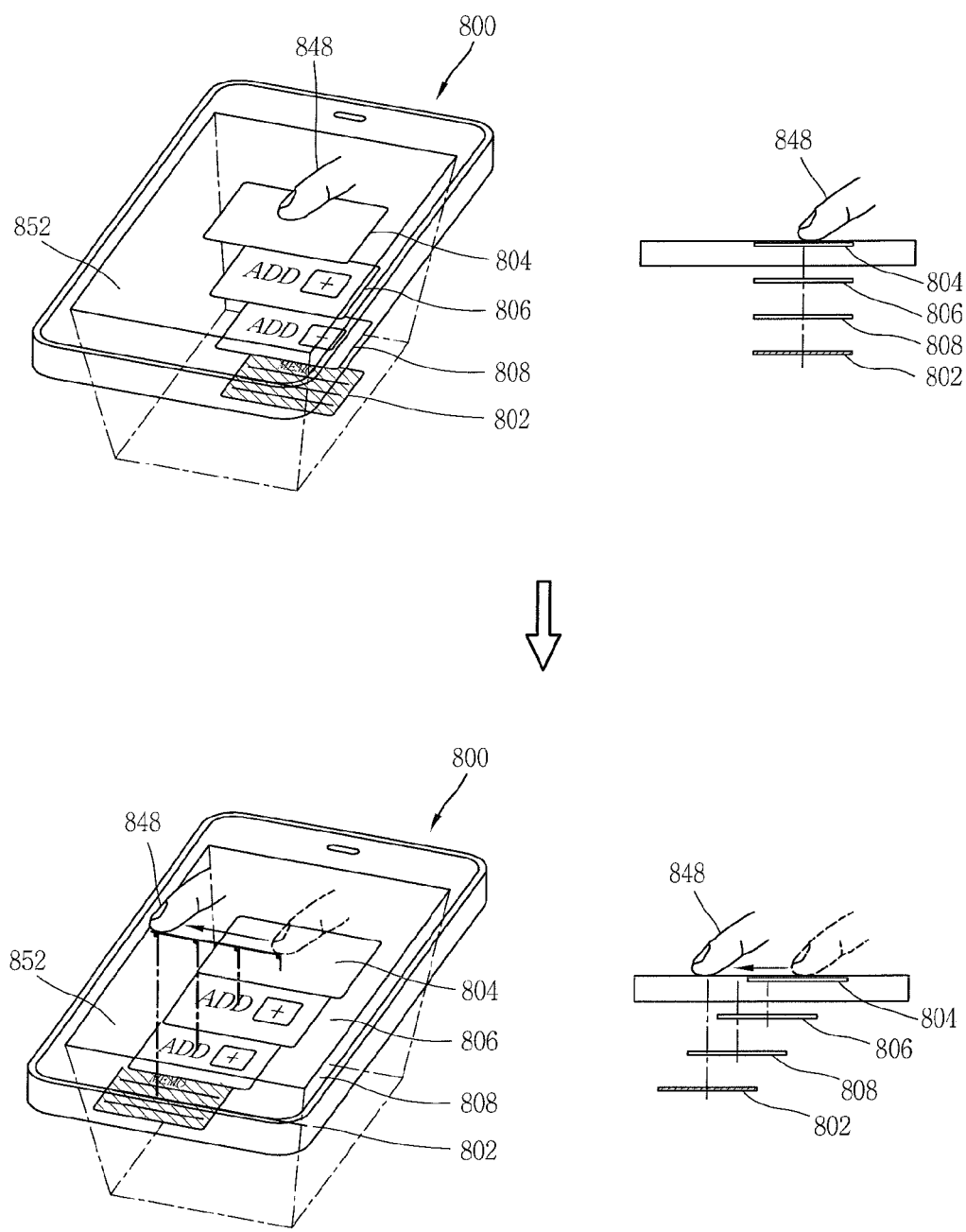
FIG. 18 is a conceptual view illustrating an operation example according to the control method illustrated in FIG. 17.

FIG. 18 is a conceptual view illustrating an operation example according to the control method illustrated in FIG. 17.

According to an operation example described herein, the solid display unit 852 may output a three-dimensional stereoscopic image implemented in the form of being sunken into the mobile terminal 800 with respect to a surface thereof. The sensing unit (not shown) senses a drag on the solid display unit 852. The controller (not shown) controls objects displayed on the three-dimensional stereoscopic image based on the sensed drag.

Referring to FIG. 18, the first object 802 is moved in the same direction as the drag direction on the solid display unit 852 while maintaining a vertical distance with respect to the solid display unit 852. Then, the location of objects 806, 808 displayed between the first and the second object 802, 804 is changed to a horizontal direction along the movement of the first object 802. For example, the location of objects 806, 808 displayed between the first and the second object 802, 804 may be changed to equalize the horizontal interval of objects 802, 804, 806, 808.

The objects 806, 808 displayed between first and the second object 802, 804 may be objects generated by increasing a distance between the first and the second object 802, 804 in a vertical direction.

As described above, according to a mobile terminal and control method thereof according to an embodiment of the present invention, it may be possible to perform an object control operation for moving a selected object according to the movement of the detection target in a three-dimensional space, and then generating or deleting at least one object, or changing the location (interval) of objects according to a distance change between objects due to the movement of the selected object. As a result, objects may be effectively controlled by using a space changed between the objects without entering an additional command except a command associated with the movement of the selected object.

Furthermore, the user's convenience can be enhanced in controlling objects displayed in a three-dimensional stereoscopic image by supporting an additional control such as add, delete, group, edit, input operation and the like for objects.

It should be understood by those skilled in the art that various modifications and changes can be made in the structure of the present invention without departing from the scope and technical spirit of the invention. Taking the foregoing description into consideration, if the modifications and variations are included within the scope of the following claims and equivalents thereof, then it should be understood that the present invention includes the modifications and changes thereof.

What is claimed is:

1. A method of controlling a mobile terminal, the method comprising:
    displaying a three-dimensional stereoscopic image including a plurality of objects;
    detecting the location of a detection target in a detection region corresponding to the three-dimensional stereoscopic image when the plurality of objects are displayed;
    selecting a first object among the plurality of objects based on the location of the detection target;
    moving the first object along the movement of the detection target when the first object is selected,
    wherein a distance between the first object and a second object among the plurality of objects is changed based on the movement of the first object; and
    generating at least one object between the first and the second object when the distance between the first and the second object is increased in one direction due to the movement of the first object,
    wherein the generated at least one object is displayed within a space between the first and the second object.

2. The method of claim 1, further comprising:
    deleting at least one of objects displayed between the first and the second object when a the distance between the first and the second object is decreased in one direction due to the movement of the first object.

3. The method of claim 2, wherein the number of objects generated between the first and the second object is determined by a degree of an increased distance between the first and the second object, and
    wherein the number of objects deleted between the first and second object is determined by a degree of a decreased distance between the first and the second object.

4. The method of claim 2, wherein the one direction is a vertical direction with respect to a display unit for outputting the three-dimensional stereoscopic image.

5. The method of claim 4, further comprising:
    changing the location of objects displayed between the first and the second object to the other direction when the first object is moved to the other direction perpendicular to the one direction.

6. The method of claim 4, further comprising:
    selecting a third object based on the location of the detection target;
    moving the first and the third object along the movement of the detection target when the first and the third object are selected; and
    generating at least one object between the first and the third object when a distance between the first and the third object is increased in one direction due to the movement of the first and the third object.

7. The method of claim 1, further comprising:
    selecting a fourth object generated between the first and the second object based on the location of the detection target; and
    controlling the fourth object when the fourth object is selected.

8. The method of claim 7, wherein said controlling the fourth object comprises:
    displaying a control menu associated with the fourth object; and
    adding a fifth object corresponding to selection information entered by using the control menu to the fourth object.

9. The method of claim 7, wherein said controlling the fourth object comprises:
    deleting the fourth object in response to a delete command entered by the detection target.

10. The method of claim 9, further comprising:
    changing the location of at least one of the remaining objects when the fourth object is deleted.

11. The method of claim 9, further comprising:
    generating a sixth object substituting the fourth object in a vacant region between the first and the second object when the fourth object is deleted.

12. The method of claim 7, wherein said controlling the fourth object comprises:
    moving the fourth object between the first and the second object along the movement of the detection target.

13. The method of claim 12, further comprising:
    changing the location of at least one object displayed between the first and the second object when the fourth object is moved.

14. The method of claim 7, wherein said controlling the fourth object comprises:
    performing an editing operation using a clipboard when the fourth object comprises the clipboard.

15. The method of claim 7, wherein said controlling the fourth object comprises:
    displaying and storing data entered by using a virtual keyboard in the fourth object when the fourth object comprises the virtual keyboard.

16. The method of claim 7, further comprising:
    fixing the first object in response to a fix command entered by the detection target.

17. The method of claim 16, wherein the fix command is entered when the detection target drags the first object out of the detection region in said fixing the first object.

18. The method of claim 16, wherein the fix command is entered based on at least one of a frequency or time that the detection target touches the first object in said fixing the first object.

19. The method of claim 1, further comprising:
    grouping the third and the fourth object when the third and fourth object displayed between the first and the second object are located in a grouped region within the three-dimensional stereoscopic image.

20. The method of claim 1, wherein the at least one object generated between the first and the second object comprises an indication reflecting an object attribute.

21. The method of claim 1, further comprising:
determining a detection range corresponding to each object displayed on the three-dimensional stereoscopic image according to a vertical distance with respect to the each object.

22. A method of controlling a mobile terminal, the method comprising:
displaying a three-dimensional stereoscopic image including a plurality of objects on a display unit;
moving a first object in a vertical direction to the display unit based on at least one of the strength, frequency, and time of a touch applied to the display unit; and
generating at least one object between the first and the second object when the first object is moved in the vertical direction to increase a distance between the first and the second object.

23. The method of claim 22, further comprising:
deleting at least one object displayed between the first and the second object when the first object is moved in the vertical direction to decrease the distance between the first and the second object.

24. The method of claim 22, further comprising:
moving the first object in a horizontal direction to the display unit based on a drag on the display unit; and
changing the location of objects displayed between the first and the second object to the horizontal direction when the first object is moved in the horizontal direction to change the distance between the first and the second object.

25. A mobile terminal, comprising:
a terminal body;
a display unit formed on the terminal body, and configured to display a three-dimensional stereoscopic image including a first and a second object;
a detection unit mounted on the terminal body to detect the location of a detection target in a detection region corresponding to the three-dimensional stereoscopic image; and
a controller configured to
select the first object based on the location of the detection target,
move the first object along the movement of the detection target when the first object is selected, wherein a distance between the first object and the second object is changed based on the movement of the first object; and
generate at least one object between the first and the second object when the distance between the first and the second object is increased in one direction due to the movement of the first object,
wherein the generated at least one object is displayed within a space between the first and the second object.

26. The mobile terminal of claim 25, wherein the controller deletes at least one object displayed between the first and the second object when the distance between the first and the second object is decreased in one direction due to the movement of the first object.

27. The mobile terminal of claim 26, wherein the controller changes the location of objects displayed between the first and the second object to the other direction when the first object is moved to the other direction perpendicular to the one direction.

* * * * *